United States Patent [19]

Nagai et al.

[11] Patent Number: 5,247,396

[45] Date of Patent: Sep. 21, 1993

[54] PCM SIGNAL RECORDING METHOD AND APPARATUS FOR RECORDING FOUR-CHANNEL DATA TO BE COMPATIBLE WITH TWO-CHANNEL DATA

[75] Inventors: Yutaka Nagai; Toshifumi Takeuchi, both of Yokohama, Japan

[73] Assignee: Hitachi, Ltd., Tokyo, Japan

[21] Appl. No.: 350,402

[22] Filed: May 11, 1989

[30] Foreign Application Priority Data

May 13, 1988 [JP] Japan .................................. 63-114647

[51] Int. Cl.[5] ............................ G11B 5/00; G11B 5/09
[52] U.S. Cl. ............................................. 360/8; 360/32
[58] Field of Search ................................ 360/8, 32, 40

[56] References Cited

U.S. PATENT DOCUMENTS

| | | | |
|---|---|---|---|
| 4,206,476 | 6/1980 | Hashimoto | 360/32 |
| 4,719,521 | 1/1988 | Juso | 360/73.04 |
| 4,734,901 | 3/1988 | Murakami | 369/59 |
| 4,758,907 | 7/1988 | Okamoto et al. | 360/32 |

OTHER PUBLICATIONS

"The DAT Conference, Digital Audio Tape Recorder System", Jun. 1987, pp. 45-54.

Primary Examiner—Aristotelis Psitos
Assistant Examiner—Won Tae C. Kim
Attorney, Agent, or Firm—Antonelli, Terry, Stout & Kraus

[57] ABSTRACT

A PCM signal recording/reproducing apparatus includes write means for writing data on a recording medium, a data detecting circuit for detecting data from the recording medium, a temporary storage unit for storing temporarily the data to be recorded on the recording medium or the data reproduced from the recording medium, an error correcting circuit for correcting error of the data through cooperation with the storage unit and a switching circuit for changing over a first mode in which first data of two channels each having a sampling frequency of 48 KHz and a quantization bit number of n are recorded/reproduced with a second mode in which second data of two channels each having a sampling frequency of 32 KHz and a quantization bit number of n are recorded/reproduced in accordance with a recording format having a data location for the input data and dummy data location for dummy data to be added to the input data. Upon recording/reproduction of data of four channels including data of main two channels each having a sampling frequency of 32 KHz and a quantization number bits of n and two-sub-channels, recording/reproduction mode is changed over to the second mode in which the main two channel data are disposed at a data location on the recording format through the storage unit, while the input sub-two-channel data are disposed at the location for the dummy data on the recording format through a second block address control circuit.

22 Claims, 18 Drawing Sheets

FIG. IA
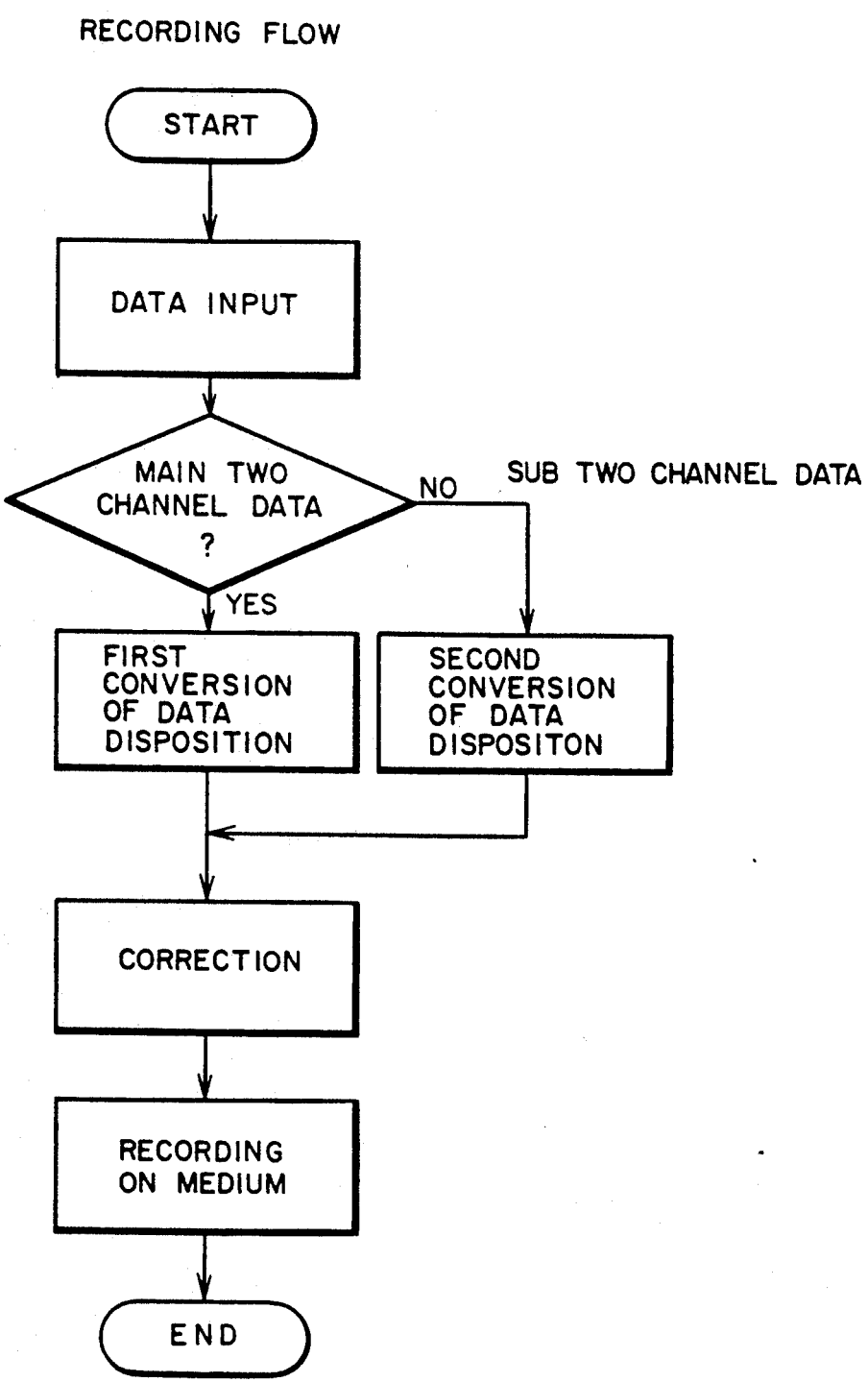

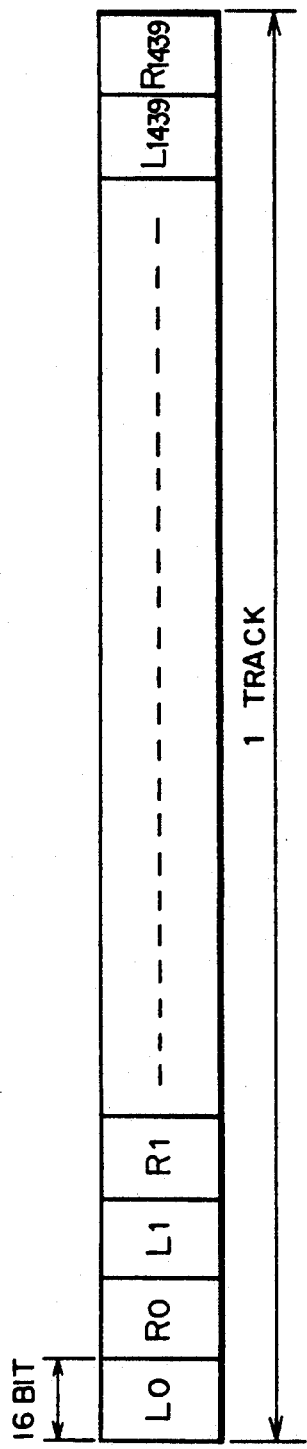
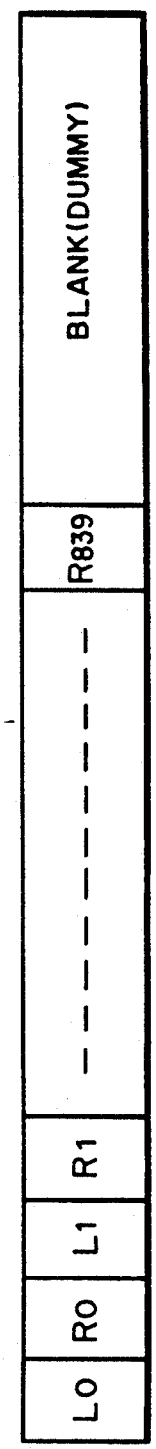
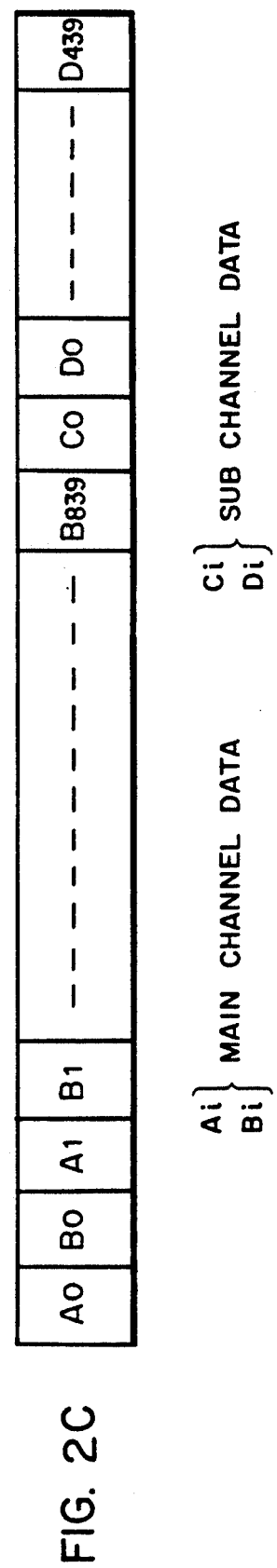
FIG. 2A
FIG. 2B
FIG. 2C

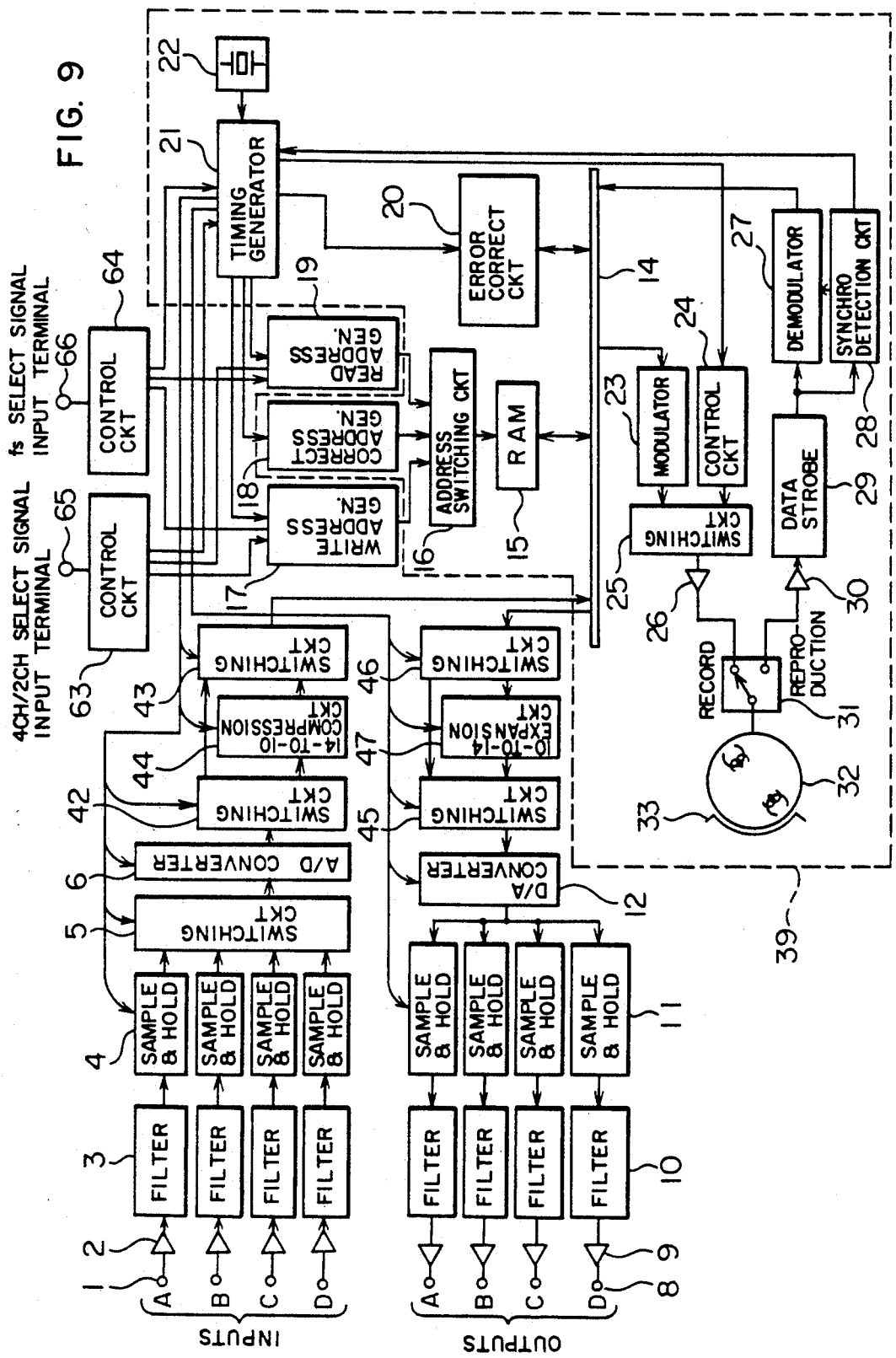

PCM SIGNAL RECORDING METHOD AND APPARATUS FOR RECORDING FOUR-CHANNEL DATA TO BE COMPATIBLE WITH TWO-CHANNEL DATA

BACKGROUND OF THE INVENTION

The present invention relates generally to a PCM signal recording method and a PCM signal recording-/reproducing apparatus and more particularly to a data recording method and a data processing circuit suited profitably for recording and/or reproduction of PCM audio signals.

Heretofore, a digital audio tape recorder system (referred to as DAT system in abbreviation) is known as an apparatus for recording/reproducing audio PCM signals. Concerning the recording format adopted in such DAT systems, discussion is found in "THE DAT CONFERENCE, DIGITAL AUDIO TAPE RECORDER SYSTEM", June, 1987, pp. 45-54.

With the structure of the recording format for the DAT system disclosed in the above literature, data of two channels each having a sampling frequency of 48 KHz and a quantization bit number of 16 bits are compatible with the data of two channels each having a sampling frequency of 32 KHz and a quantization bit number of 16 bits, and these data of respective formats can be recorded and reproduced without any need for a complicated switching (exchange) circuit.

Further known is an audio system for performing recording/reproduction of PCM audio signals of two channels having a sampling frequency of 48 KHz and a quantization bit number of 16 bits, which apparatus additionally includes a data conversion circuit having a data format converting or translating function so that four channel audio PCM signals each having a sampling frequency of 32 KHz and a quantization bit number of 12 bits can be recorded and reproduced, as is disclosed in JP-A-61-236074.

However, in the prior art DAT systems mentioned above, no consideration is paid to the compatibility between the four channel mode in which the sampling frequency ($f_s$) is 32 KHz and the quantization bit number is 16 bits and the two channel mode where the sampling frequency ($f_s$) is 32 KHz and the quantization bit number is 16 bits. Accordingly, the recording/reproduction apparatus designed for the audio PCM signals of two channels having the sampling frequency of 48 KHz and the quantization bit number of 16 bits on one hand and the PCM signals of the two channels having the sampling frequency of 32 KHz and the quantization bit number of 16 bits on the other hand is incapable of reproducing the recorded audio PCM signals of the four channels each having a sampling frequency of 32 KHz and a quantization bit number of 16 bits. Further, for making it possible to reproduce the four channel data mentioned above, such a circuit which is capable of recording/reproducing the data of two channels at the sampling frequencies of 48 KHz and 32 KHz, respectively, with the quantization bit number of 16 bits must be additionally provided in association with a complicated data switching circuit.

In the system capable of performing the recording and the reproduction with the format for the four channels each having the sampling frequency of 32 KHz and the quantization bit number of 12 bits, as disclosed in JP-A-236074, the recording/reproduction of data of two channels having the sampling frequency of 32 KHz and the quantization bit number of 16 bits can be rendered only by performing 16-to-12 bit compression and 12-to-16bit expansion on the audio PCM signal and by using the format for only two of the four channels. In that case, compatibility may be ensured between the audio PCM signals of four channels having the sampling frequency of 32 KHz and the quantization bit number of 12 bits and the audio PCM signals of two channels having the sampling frequency of 32 KHz and the quantization bit number of 16 bits.

However, such system is disadvantageous in that the circuits for 16-to-12 bit compression and 12-to-16 bit expansion are additionally required and suffers a problem that the audio PCM signals of two channels having the sampling frequency of 32 KHz and the quantization bit number of 16 bits is subject to deterioration in the performance or quality due to the compression and expansion mentioned above.

SUMMARY OF THE INVENTION

An object of the present invention is to provide a method and an apparatus for recording audio PCM signals of four channels each having a sampling frequency of 32 KHz and a quantization bit number of 16 bits. The method and apparatus allow even the audio PCM signals of two channels having a sampling frequency of 32 KHz to be reproduced by the conventional apparatus designed for the recording and the reproduction of both the data of two channels having a sampling frequency of 48 KHz and a quantization bit number of 16 bits and the data of two channels having a sampling frequency of 32 KHz and a quantization bit. This is done number of 16 bits by utilizing a portion of a format for the-two channels of data of the sampling frequency of 48 KHz and the quantization bit number of 16 bits for blank or dummy data.

The above object can be accomplished according to an aspect of the present invention by additionally providing the conventional apparatus with a data format conversion (exchange) circuit. This circuit is so implemented as to record in the dummy data portion taking place in the format when the data of two channels are recorded at the sampling frequency of 32 KHz and a quantization bit number of 16 bits the data of the remaining two channels in such a format that the quantization bit number is maintained at 16 bits while the sampling frequency is changed to 16 KHz so as to comply with the first mentioned format.

According to another aspect of the present invention, the above object can be achieved by additionally providing the conventional apparatus with a data disposition conversion or exchange circuit. This circuit is so implemented that the quantization bit number of data of main two channels having the sampling frequency of 32 KHz is changed to 14 bits while data of sub-two-channels is quantized in 14 bits and then compressed to 10 bits while the sampling frequency is maintained at 32 KHz to be subsequently recorded in the dummy data portion in accordance with the recording format for the data of the main two channels.

According to a further aspect of the invention, the abovementioned object can be achieved by converting the conventional apparatus into a three channel system by additionally providing the former with a data conversion circuit. This circuit employs a recording format wherein in the dummy data portion taking place upon recording of data of two channels at the sampling frequency of 32 KHz and the quantization bit number 16 bits, a sum data or signal of the remaining two channels is recorded at the sampling frequency of 32 KHz and the quantization bit number of 16 bits in conformance with the format for the first mentioned two channel data.

The data conversion circuit is adapted to record in a place to be filled with the dummy data upon recording in the two main channel mode at the sampling frequency of 32 KHz the data of sub-two-channels by correspondingly transforming the latter. By virtue of the provision of this data conversion circuit, there can be realized the recording and/or reproduction of data of four channels in total, i.e. main two data channels (having the sampling frequency or $f_s$ of 32 KHz and quantization bit number of 16) and sub-two-data channels (having $f_s$ of 16 KHz quantization bit number of 16) or four channels including the main two data channels (having $f_s$ of 32 KHz and quantization bit number of 14) and sub-two-data channels (having $f_s$ of 32 KHz and quantization bit number of 10), or the data of three channels in total including the main two data channels (having $f_s$ of 32 KHz and quantization bit number of 16 bits) and one channel for a sum signal (having $f_s$ of 32 KHz and quantization bit number of 16) of the sub-two-channel data. According to the PCM audio signal or data recording/reproducing apparatus of the invention, the main two channel data of the audio PCM signals of four channels or three channels as recorded can be reproduced by an apparatus capable of recording/reproducing the data of two channels having the sampling frequency ($f_s$) of 48 KHz and the quantization bit number of 16 bits or the two channels having the sampling frequency of 32 KHz and the quantization bit number of 16, even when the apparatus is not equipped with the data conversion circuit, because the main two channels of the former and the latter coincide with each other in respect to the data format.

BRIEF DESCRIPTION OF THE DRAWINGS

FIGS. 1A and 1B are flow charts illustrating schematically data recording operation and data reproducing operation, respectively, of the apparatus shown in FIG. 1;

FIGS. 2A to 2C are diagrams for illustrating the concept underlying the recording format adopted in the apparatus shown in FIG. 1;

FIG. 9 is a block diagram showing an arrangement of a further embodiment of the invention;

DESCRIPTION OF THE PREFERRED EMBODIMENTS

In the following, the present invention will be described in detail in conjunction with preferred or exemplary embodiments thereof by reference to the accompanying drawings.

Figure 1:
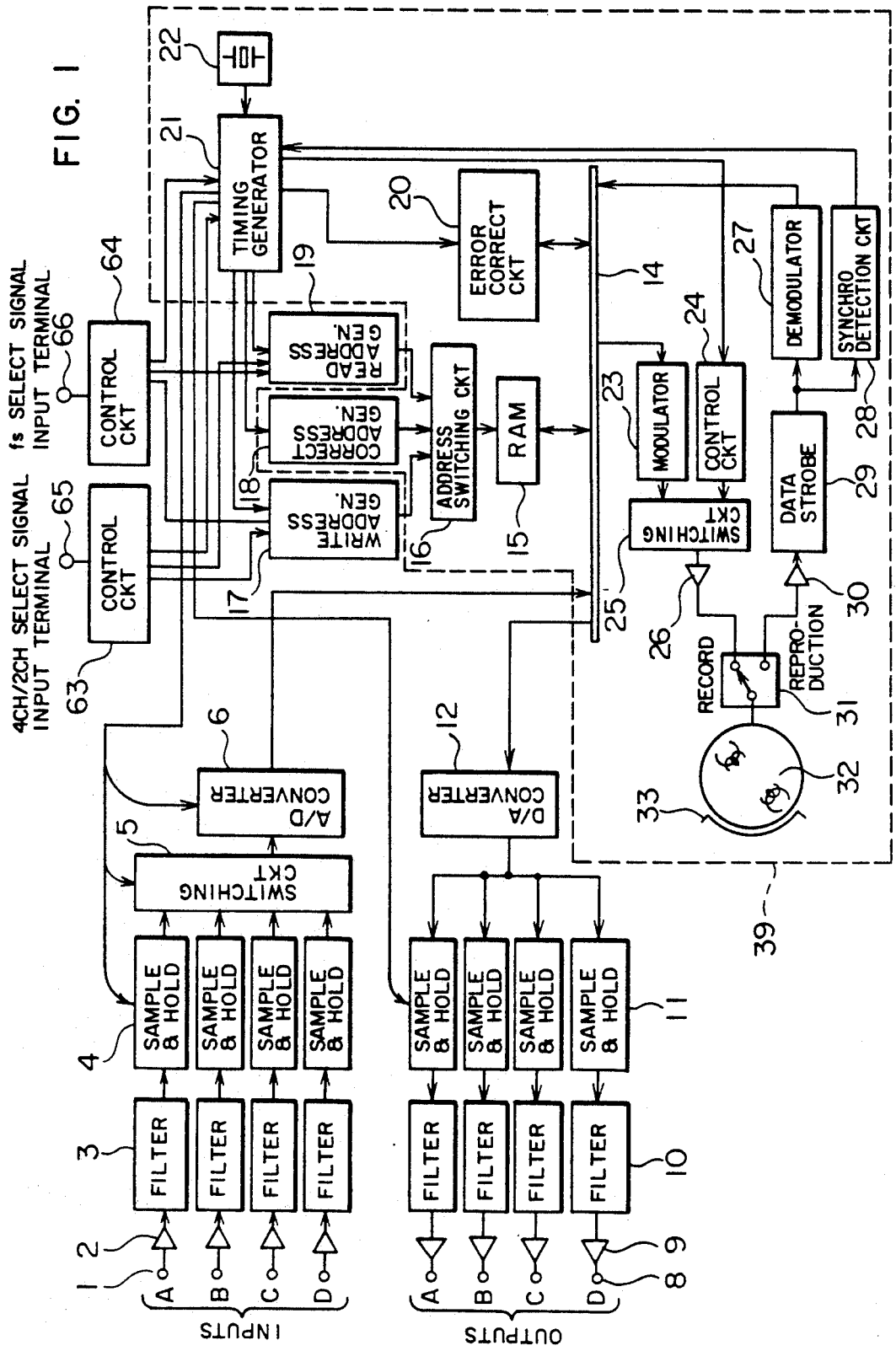
FIG. 1 is a block diagram showing a general arrangement of the PCM signal recording/reproducing apparatus according to an embodiment of the invention.
Figure 1B:
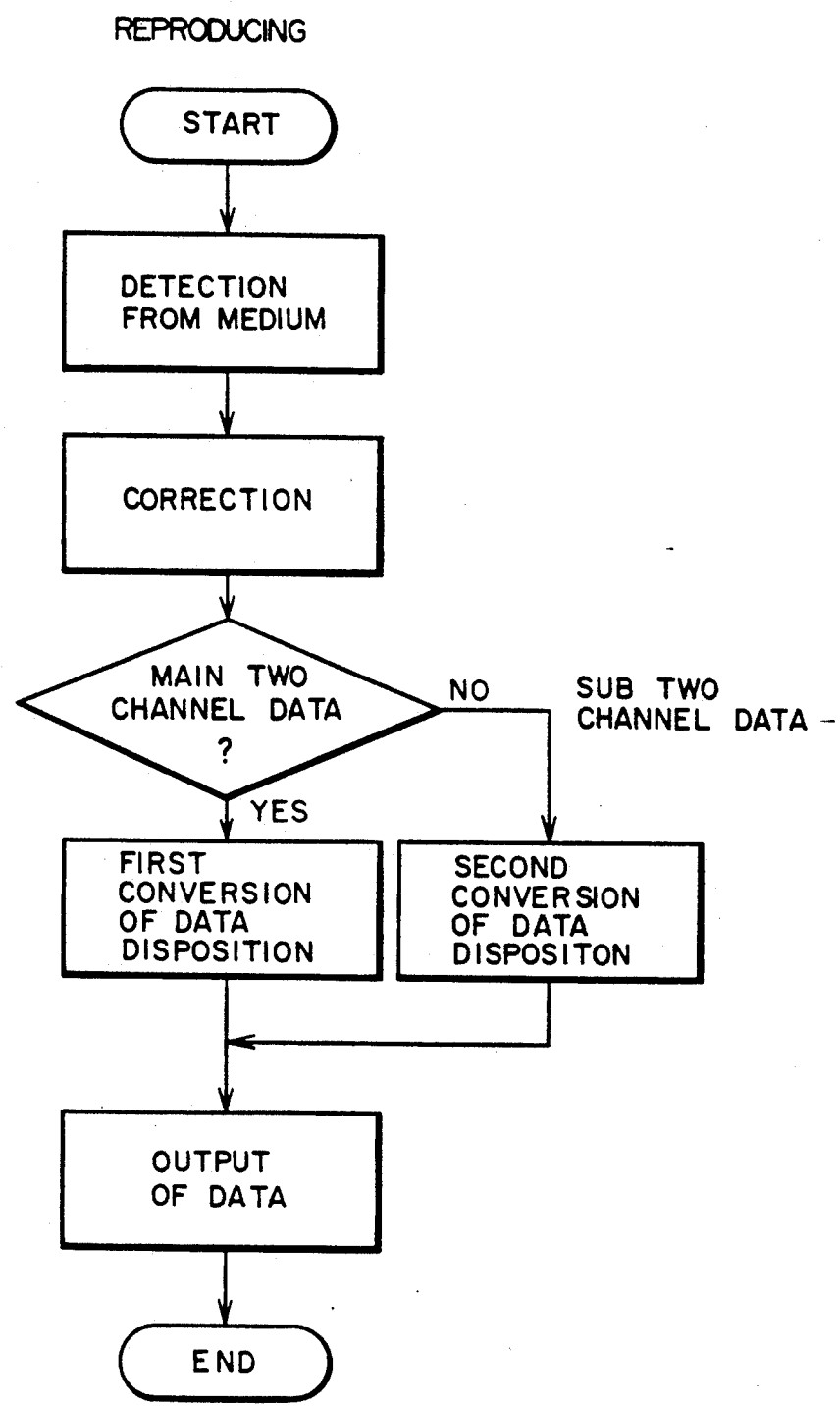

FIG. 1 shows in a block diagram a general arrangement of the PCM signal (or data) recording/reproducing apparatus according to an embodiment of the invention.

Figure 3:
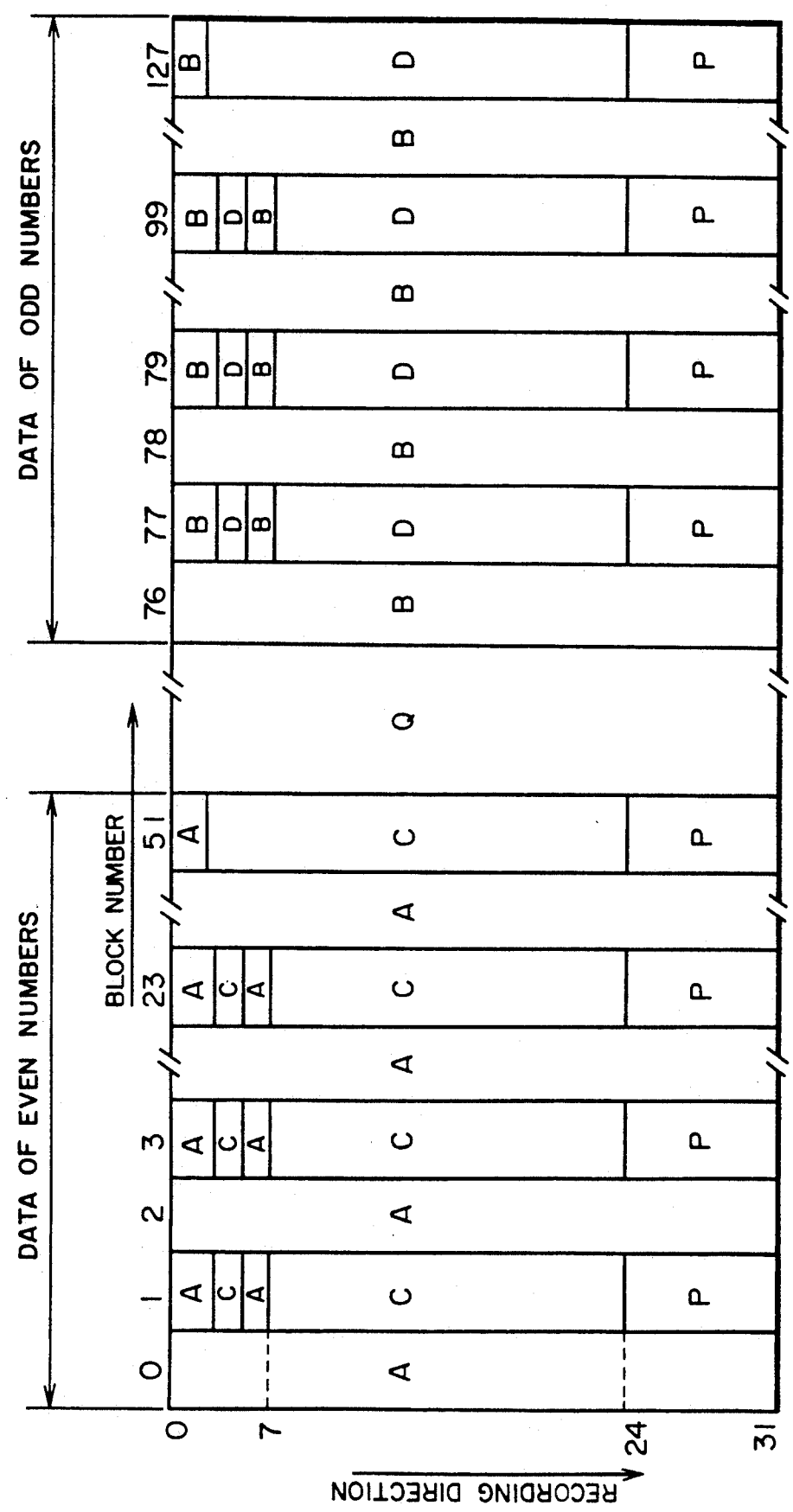
FIGS. 3 and 4 are diagrams showing examples of the recording formats which can be employed in the apparatus shown in FIG. 1.
Figure 4:
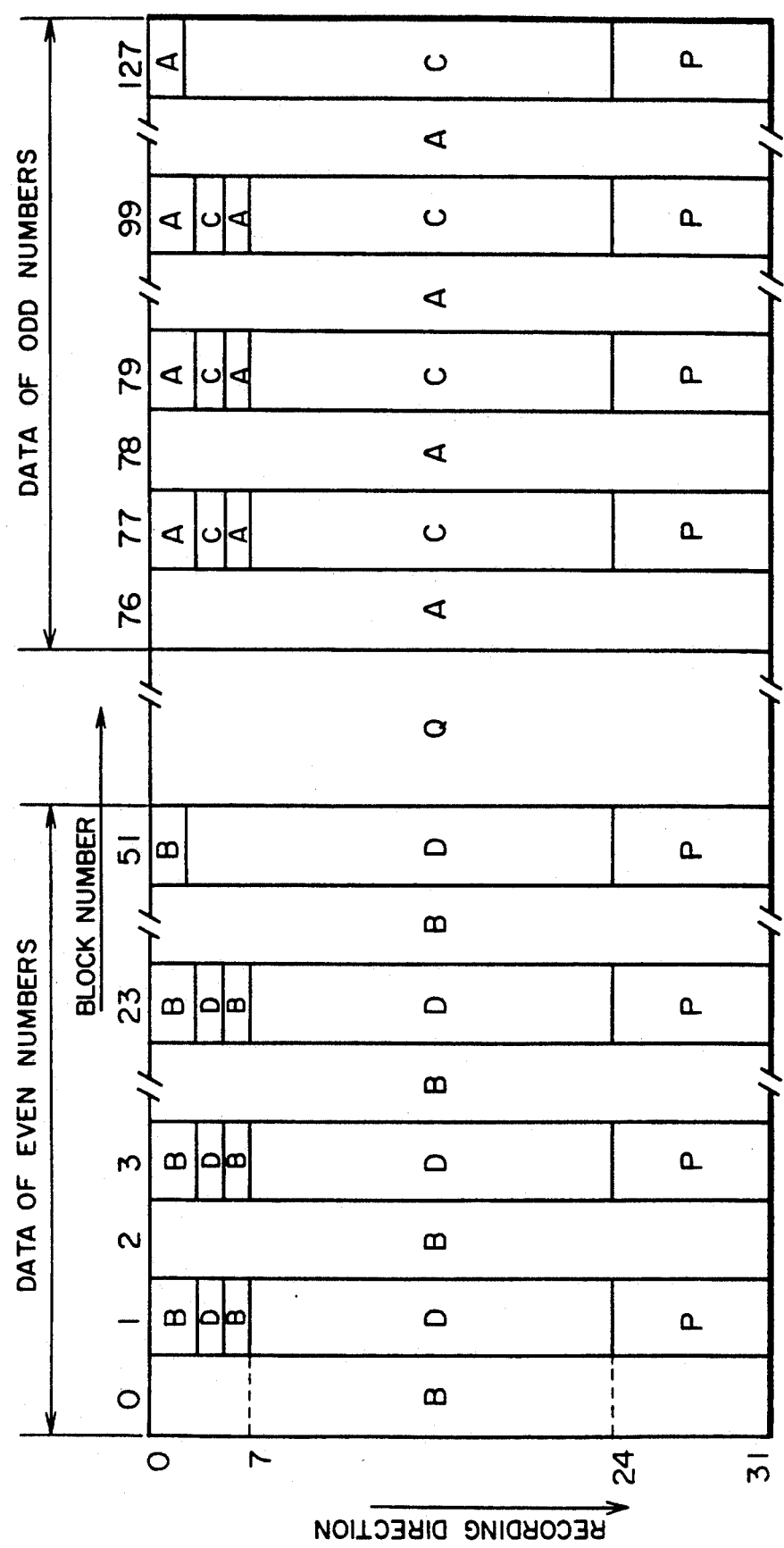

Referring to the Figure, there are inputted analog signals A, B, C and D of four channels through input terminals 1 in the recording mode. Each of the input signals is amplified to a predetermined level by an associated amplifier circuit 2 and undergoes band limitation through a filter 3 to be subsequently sampled by a sample and hold circuit 4. The input signals thus sampled are sequentially supplied to an analog-to-digital (A/D) converter 6 through a switching circuit 5 to be converted into PCM signals which are then written in a random access memory or RAM 15 by way of a bus line 14. Under the control of a control circuit 64 having an input terminal 66 supplied with a sampling frequency ($f_s$) select signal or a control circuit 63 having an input terminal 65 supplied with a four channel (4 CH)/two channel (2 CH) select signal control for the RAM 15 is performed through cooperation of address generating circuits 17, 18 and 19 and an address switching circuit 16 for conversion of disposition of the PCM signals in accordance with the concept illustrated in FIGS. 2A, 2B and 2C in which correspondence in the disposition or arrangement of the PCM signals recorded on one track (plus azimuth, minus azimuth) between different modes is conceptually illustrated. More specifically, FIG. 2A shows the concept of disposition of the two channel PCM signals each quantized in 16 bits and sampled at a sampling frequency of 48 KHz on one track (plus azimuth, minus azimuth), FIG. 2B shows the concept of disposition of the two channel PCM signals each quantized in 16 bits and sampled at the sampling frequency of 32 KHz, for one track (plus azimuth, minus azimuth). In the latter case, the number of the data bits for one track is smaller than the former case shown in FIG. 2A where the sampling frequency of 48 KHz is used. However, in order to ensure the transfer rate to be constant in the succeeding processing path, the dummy data portion of the track for the PCM signals sampled at the 32 KHz is utilized for dummy data, as will be seen in FIG. 2B. FIG. 2C shows another concept of arrangement of the four channel PCM signals on one track (plus azimuth, minus azimuth). In the case, of the disposition shown in FIG. 2C, the four channels are divided into main two channels and sub two channels. The main channels are each assigned to the PCM signal quantized in 16 bits and sampled at the sampling frequency of 32 KHz, wherein the PCM signals are disposed at the same locations as the PCM signals shown in FIG. 2B are recorded. On the other hand, the sub two channels are assigned for the PCM signals each quantized in 16 bits and sampled at a sampling frequency of 16 KHz, which PCM signals are disposed at the locations corresponding to those for the dummy data shown in FIG. 2B. The number of the data bits for one track of the four channel PCM signals is same as that of the two channel PCM signals each quantized in 16 bits and sampled at the frequency of 48 KHz, as described above in conjunction with FIG. 2A. Accordingly, the transfer rate in the succeeding recording/reproducing operation is same as in the cases of the PCM signals shown in FIGS. 2A and 2B. The foregoing description made by reference to FIGS. 2A to 2C concerns only the conceptual disposition of the PCM signals. In the case of the actual DAT system, interleave and addition of error correction codes are performed in accordance with the format of the DAT system. Consequently, dispositions of the PCM signals will be such as illustrated in FIGS. 3 and 4. Addition, of the error correction codes is performed by an error correcting circuit 20. After arrangement of the PCM signals and addition of the error correction codes described above, the data are read out from the RAM 15 on a block-by-block basis and modulated by a modulating circuit 23. Subsequently, in a control signal generating circuit 24 and a switching circuit 25, control signals such as a synchronizing signal and others are added and then amplified to a predetermined level by a recording amplifier 26 to be subsequently recorded on a magnetic tape 33 by means of a rotary head 32. The switching circuit 31 serves for changing over the recording and reproduction modes to each other. A timing generating circuit 21 serves to generate a timing signal for controlling the whole system from a clock signal generated by an oscillation circuit 22.

In the reproducing operation, the switching circuit 31 is changed over to the reproduction mode, whereby the signal picked up by the rotary head 32 is inputted to a reproducing amplifier 30 to undergo amplification and waveform equalization. The output signal from the reproducing amplifier 30 is converted into a digital signal by a data strobe circuit 29, whereon demodulation of the data is performed by a demodulating circuit 27 while the synchronizing signal is detected by a synchronizing signal detecting circuit 28. The synchronizing signal detected is utilized as a reference for the data reproduction. The data demodulated by the demodulating circuit 27 is stored in the RAM 15 and then undergoes the conversion of disposition reversely to the conversion in the recording operation described above and the error correction by the error correcting circuit 20. The signal thus obtained is supplied to a digital-to-analog (D/A) conversion circuit 12 by way of the bus line 14 to be sequentially converted into an analog signal which is then resampled by sample and hold circuit 11 separately on a channel basis. The resampled analog signals of the individual channels are sent out from output terminals 8 through associated filters 10 and amplifier circuits 9, respectively.

A circuit portion 39 indicated by enclosing with a broken line in FIG. 1 is implemented in the same configuration as the prior art DAT system designed for recording the two channel PCM signals each quantized in 16 bits and sampled at a frequency of 48 KHz. According to the present invention, the write address control circuit 17 and the read address control circuit 19 for the address generating circuits 17 to 19 are so modified as to be controlled by the control circuits 63 and 64 to thereby realize the dispositions of the PCM signals illustrated in FIGS. 3 and 4 such that the four channel PCM signals in total including the two channel PCM signals quantized in 16 bits and sampled at the frequency of 32 KHz and the two channel PCM signals quantized in 16 bits and sampled at 16 KHz can be recorded.

In the case of the illustrated embodiment, the main two of the four channel PCM signals can be recorded in the utterly same format as that for the two channel mode of the DAT system in which the sampling frequency is 32 KHz and the quantizing is 16 bits. Thus, the four channel PCM signals recorded according to the teaching of the present invention can also be regenerated by the conventional DAT system in which the address generating circuits 17 and 19 are not modified in such manner as described above. Besides, in addition to the DAT system, the illustrated embodiment of the PCM signal recording/reproducing apparatus according to the invention which has the recording mode for the two channel PCM signals quantized in 16 bits and sampled at 48 KHz and in which the unnecessary portion of each track is employed for the dummy data, as described hereinbefore in conjunction with FIG. 2B, can equally be applied to all the magnetic recording/reproducing apparatuses having the same recording rate as that for the abovementioned mode of the two channel PCM signals each quantized in 16 bits and sampled at 32 KHz.

Next, another embodiment of the present invention will be described by referring to FIG. 5.

Figure 5:
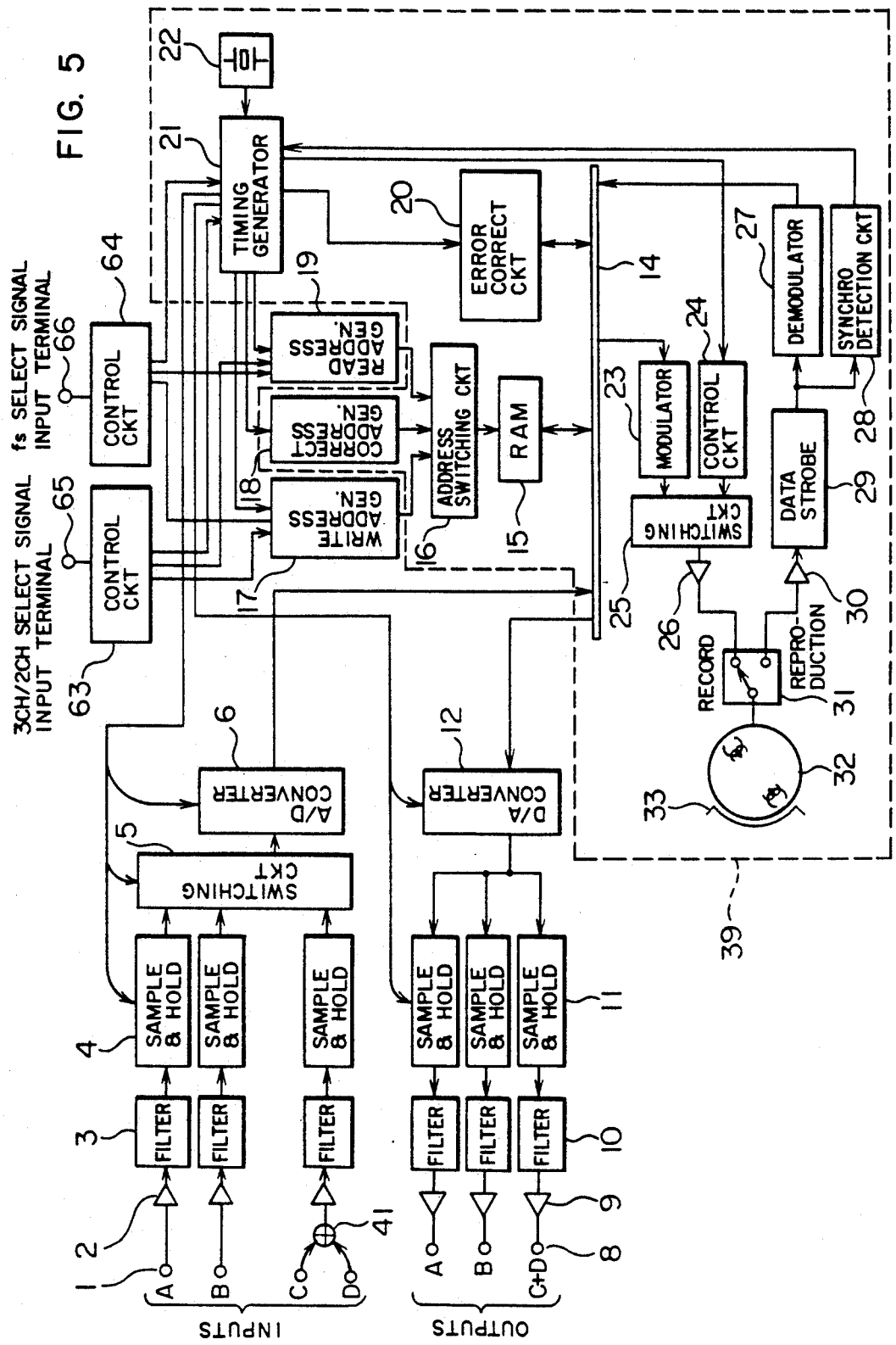
FIG. 5 is a block diagram showing a general arrangement of the apparatus according to another embodiment of the present invention.

FIG. 5 shows in a block diagram a general arrangement of the PCM signal recording/reproducing apparatus of a rotary head type according to the invention.

Upon recording operation, analog signals A, B, C and D of four channels are inputted through input terminals 1.

Figure 6A:
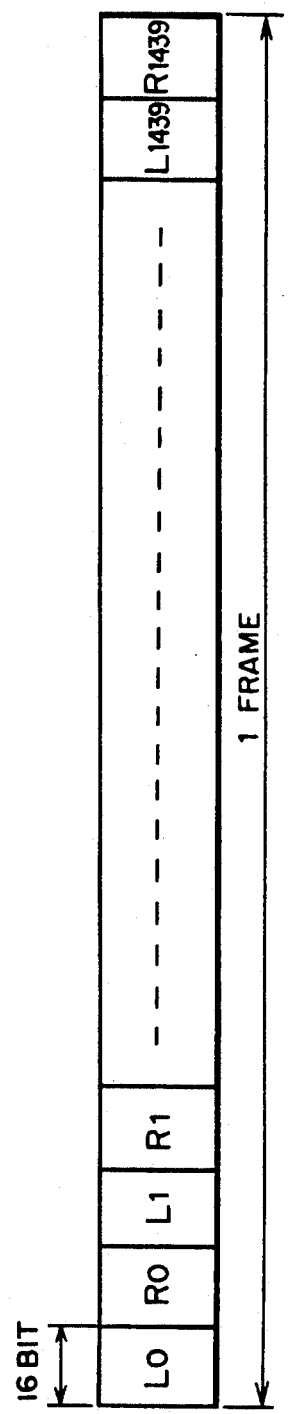
FIGS. 6A, 6B and 6C are diagrams for illustrating the concept underlying the format adopted in the apparatus shown in FIG. 5.
Figure 6B:
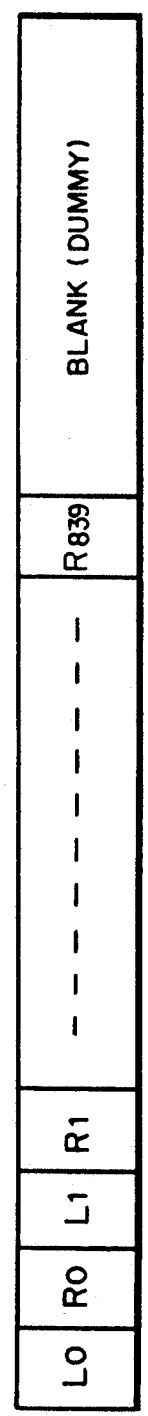
Figure 6C:
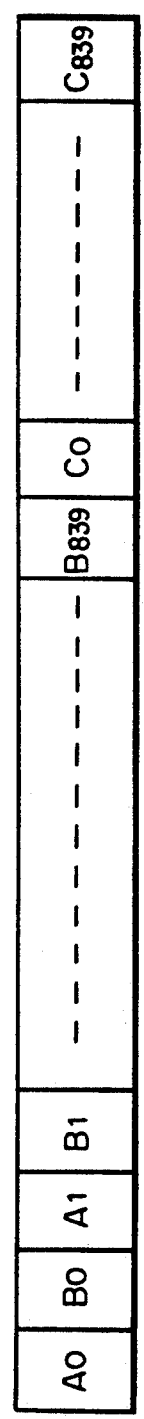
Figure 7:
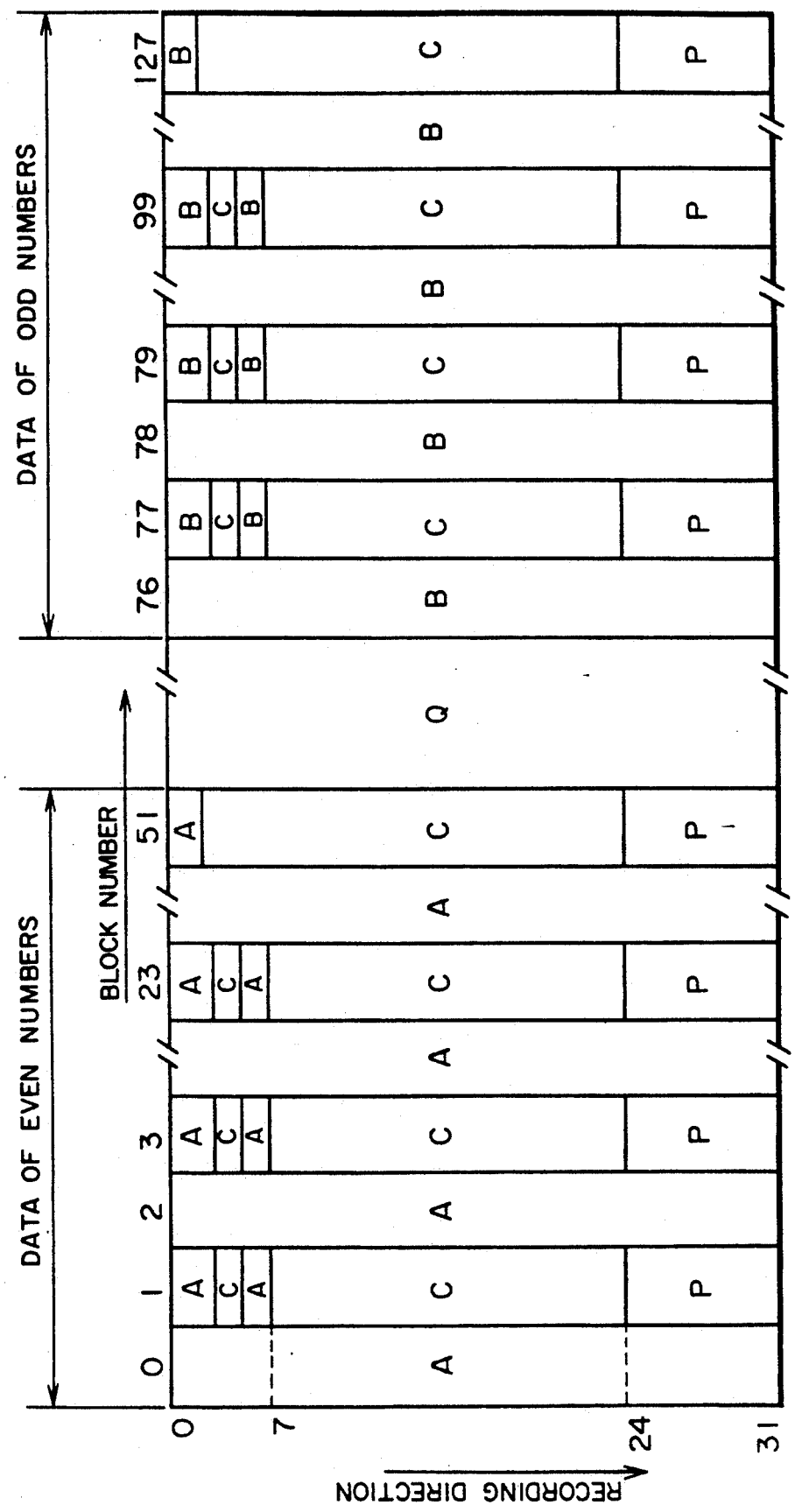
FIGS. 7 and 8 are diagrams showing examples of the recording format which are employed in the apparatus shown in FIG. 5.
Figure 8:
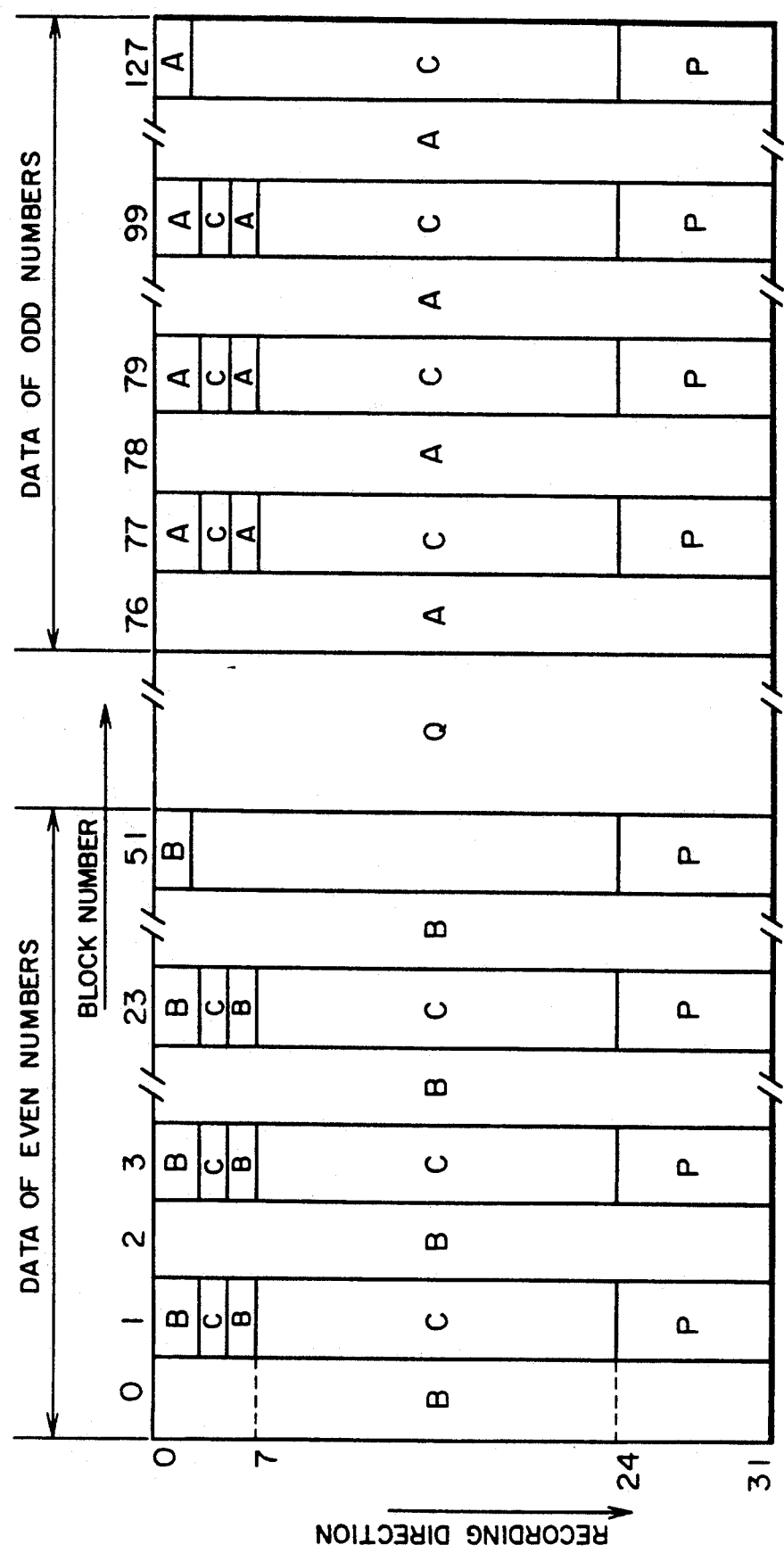

Of these analog input signals, the input signals C and D are added together by an adder circuit 41, whereby a sum signal represented by (C+D) is produced. The input signals A and B and the sum signal (C+D) are each amplified to a predetermined level by associated amplifier circuits 2 and undergo band limitation through filters 3 to be subsequently sampled by a sample and hold circuit 4. The input signals thus sampled are sequentially supplied to an A/D converter 6 through a switching circuit 5 to be converted into PCM signals which are then written in a random access memory or RAM 15 by way of a bus line 14. Under the control of a control circuit 64 having an input terminal 66 supplied with a sampling frequency ($f_s$) select signal or a control circuit 63 having an input terminal 65 supplied with a three channel/two channel select signal, the address control for the RAM 15 is performed through cooperation of address generating circuit 17, 18 or 19 and an address switching circuit 16 for converting or translating the disposition of the PCM signals in accordance with the concept illustrated in FIGS. 6A, 6B and 6C in which correspondence in the disposition of the PCM signals recorded on one track (plus azimuth, minus azimuth) between different modes is conceptually illustrated. More specifically, FIG. 6A shows the concept of disposition of the two channel PCM signals each quantized in 16 bits and sampled at a sampling frequency of 48 KHz on one track (plus azimuth, minus azimuth), and FIG. 6B shows the concept of disposition of the two channel PCM signals each quantized in 16 bits and sampled at the sampling frequency of 32 KHz for one track (plus azimuth, minus azimuth), as in the case of FIGS. 2A and 2B, respectively. On the other hand, FIG. 6C shows the concept of disposition of the three channel PCM signals on one track (plus azimuth, minus azimuth). In the disposition shown in FIG. 6C, the three channels are divided into main two channels and one sub-channel. The one sub-channel corresponds to the sum signal of two channel audio signals obtained as the output of the adder circuit 41. The main two channels are each assigned for the PCM signal quantized in 16 bits and sampled at the sampling frequency of 32 KHz, which PCM signal is disposed at the same location as the PCM signal shown in FIG. 6B is recorded. On the other hand, the sub one channel is assigned to the PCM signal quantized in 16 bits and sampled at the sampling frequency of 32 KHz, which PCM signal is arranged at the position corresponding to that for the dummy data shown in FIG. 6B. The number of the data bits for one track of the three channel PCM signals derived from the four channel audio signals is same as that of the two channel PCM signals each quantized in 16 bits and sampled at the frequency of 48 KHz, as described above in conjunction with FIG. 6A. The foregoing description made by reference to FIGS. 6A to 6C concerns only the conceptual disposition of the PCM signals. In the case of the practical DAT system, interleave and addition of the error correction codes are performed in accordance with the format adopted in the DAT system. Consequently, dispositions of the PCM signals are such as illustrated in FIGS. 7 and 8. After the conversion of disposition, the subsequent processing up to the recording on the magnetic recording tape is same as in the case of the embodiment shown in FIG. 1.

In the reproducing operation, the processing up to the storage of the data in the RAM 15 is performed in the same manner as described hereinbefore in conjunction with the embodiment shown in FIG. 1. The data stored in the RAM 15 then undergoes the conversion of disposition reversely to the conversion in the recording operation described above as well as the error correction by the error correcting circuit 20. The signal thus obtained is supplied to a D/A converter 12 by way of the bus line 14 to be sequentially converted into an analog signal which is then resampled by a sample and hold circuit 11 on a channel basis. The resampled analog signals of the individual channels are sent out from output terminals 8 through associated filters 10 and amplifier circuits 9 as the analog signals A and B and the sum analog signal (C+D), respectively.

A circuit portion 39 indicated by enclosing with a broken line in FIG. 5 is implemented in the same configuration as the conventional DAT system designed for recording the two channel PCM signals each quantized in 16 bits and sampled at the frequency of 48 KHz. According to the present invention, the write address control circuit 17 and the read address control circuit 19 of the address generating circuits 17 to 19 are modified by adding the control circuits 63 and 64 for realizing the dispositions of the PCM signals illustrated in FIGS. 7 and 8 and by adding the adder circuit 41 for the purpose of making it possible to record the four channel audio signals as the three channel data each quantized in 16 bits and sampled at the sampling frequency of 32 KHz.

In the case of the instant embodiment, the two main channel PCM signals are recorded in the utterly same format as that of the two channel mode of the DAT system in which the sampling frequency is 32 KHz and the quantizing bit number is 16 bits. For this reason, the two channel PCM signals recorded according to the teaching of the invention incarnated in this embodiment can also be regenerated by the conventional DAT system in which neither the address generating circuits 17 and 19 are modified in the manner as described above nor the adder circuit 41 is provided. Besides, in addition to the DAT system, the instant embodiment of the invention having the recording mode for the two channel PCM signals quantized in 16 bits and sampled at 48 KHz where the unnecessary portion is placed with the dummy data can equally be applied to all the magnetic recording/reproducing apparatuses having the same recording rate as that of the above-mentioned mode for the two channel PCM signals each quantized in 16 bits and sampled at 32 KHz.

A further embodiment of the invention will be described by referring to FIG. 9.

FIG. 9 shows in a block diagram a general arrangement of the PCM recording/reproducing apparatus of a rotary head type according to an embodiment of the invention.

Figure 10A:
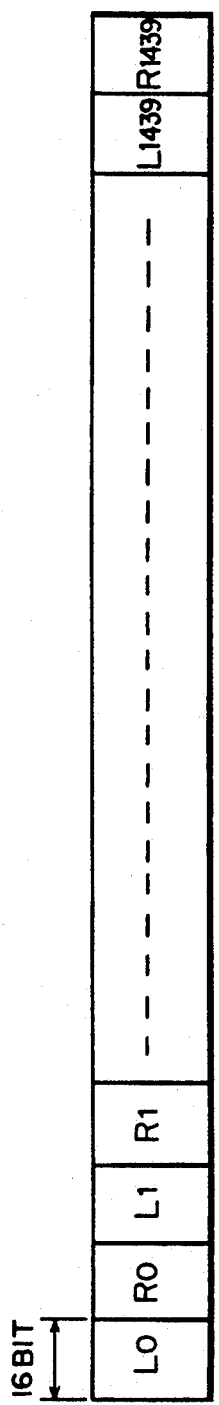
FIGS. 10A to 10D are diagrams for illustrating the concept underlying the recording format adopted in the apparatus shown in FIG. 9.
Figure 10B:
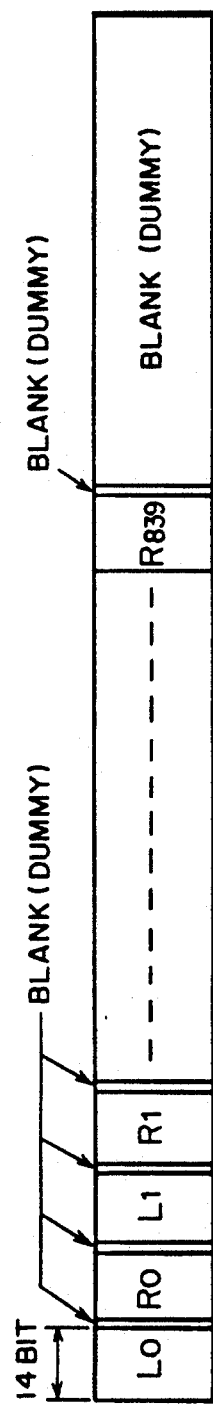

In the recording operation, there are inputted analog signals A, B, C and D of four channels through input terminals 1. Each of the input signals is amplified to a predetermined level by an associated amplifier circuit 2 and undergoes band limitation through a filter 3 to be subsequently sampled by a sample and hold circuit 4. The input signals thus sampled are sequentially supplied to an A/D converter 6 through a switching circuit 5 to be converted into PCM signals. Of the PCM signals resulting from the conversion by the A/D converter 6, those PCM signals which correspond to the analog input signals A and B, respectively, are written in a RAM 15 through switching circuits 42 and 43 by way of a bus line 14. On the other hand, the PCM signals corresponding to the input analog signals C and D are caused to undergo a 14-to-10 bit compression in a compression circuit 44 by the switching circuits 42 and 43 before being written in the RAM 15 through the bus line 14. More specifically, the audio PCM signals each of 14 bits inputted to the 14-to-10 bit compression circuit 44 are compressed to the PCM signals each of 10 bits. The output signals obtained through the switching circuit 43 are written in the RAM in the sequence illustrated in FIG. 10C on an eight bit basis. Subsequently, under the control of a control circuit 64 having an input terminal 66 supplied with a sampling frequency select signal or a control circuit 63 having an input terminal 65 supplied with a four channel/two channel select signal, the address control for the RAM 15 are performed through cooperation of address generating circuit 17, 18 and 19 as well as an address switching circuit 16 for the conversion of disposition of the PCM data in accordance with the concept illustrated in FIG. 10A, 10B, 10C and 10D in which correspondence in the disposition of the PCM signals recorded on one track (plus azimuth, minus azimuth) among different modes is conceptually illustrated. More specifically, FIG. 10A shows the concept of disposition of the two channel PCM signals each quantized in 16 bits and sampled at the sampling frequency of 48 KHz on one track (plus azimuth, minus azimuth), while FIG. 10B shows the concept of disposition of the two channel PCM signals each quantized in 14 bits and sampled at the sampling frequency of 32 KHz for one track (plus azimuth, minus azimuth). In the latter case, the number of the data bits for one track is smaller than the case shown in FIG. 10A where the sampling frequency of 48 KHz is used. Accordingly, with a view to making the transfer rate to be constant in the succeeding processing, the blank portion of the track for the PCM signals sampled at the 32 KHz is placed with dummy data, as shown in FIG. 10B.

Figure 10C:
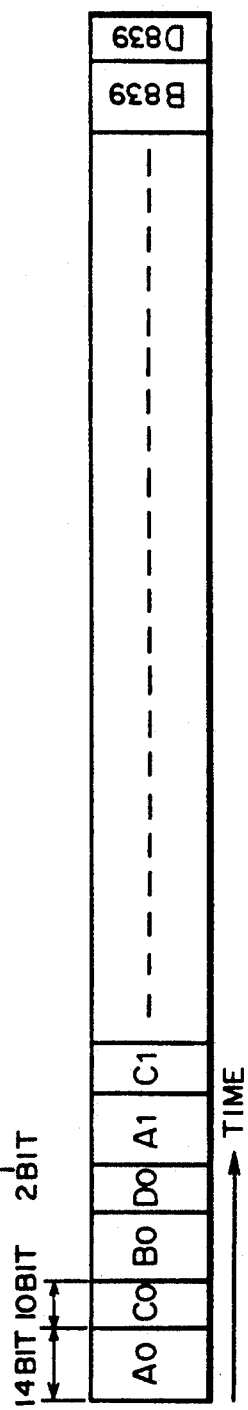
Figure 10D:
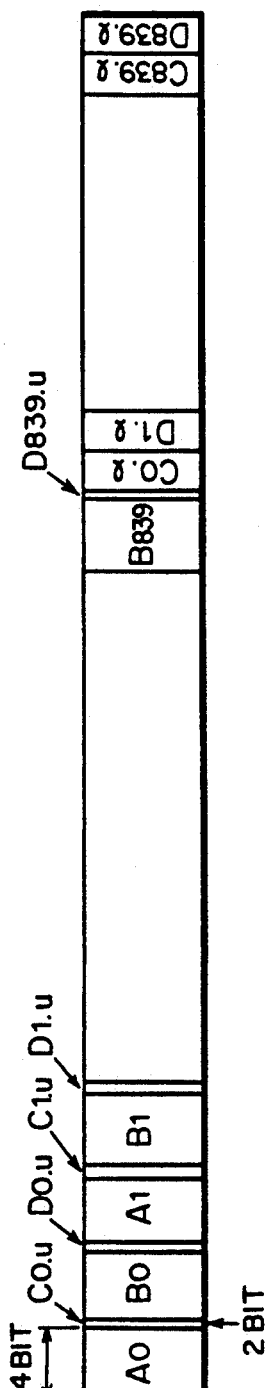
Figure 11:
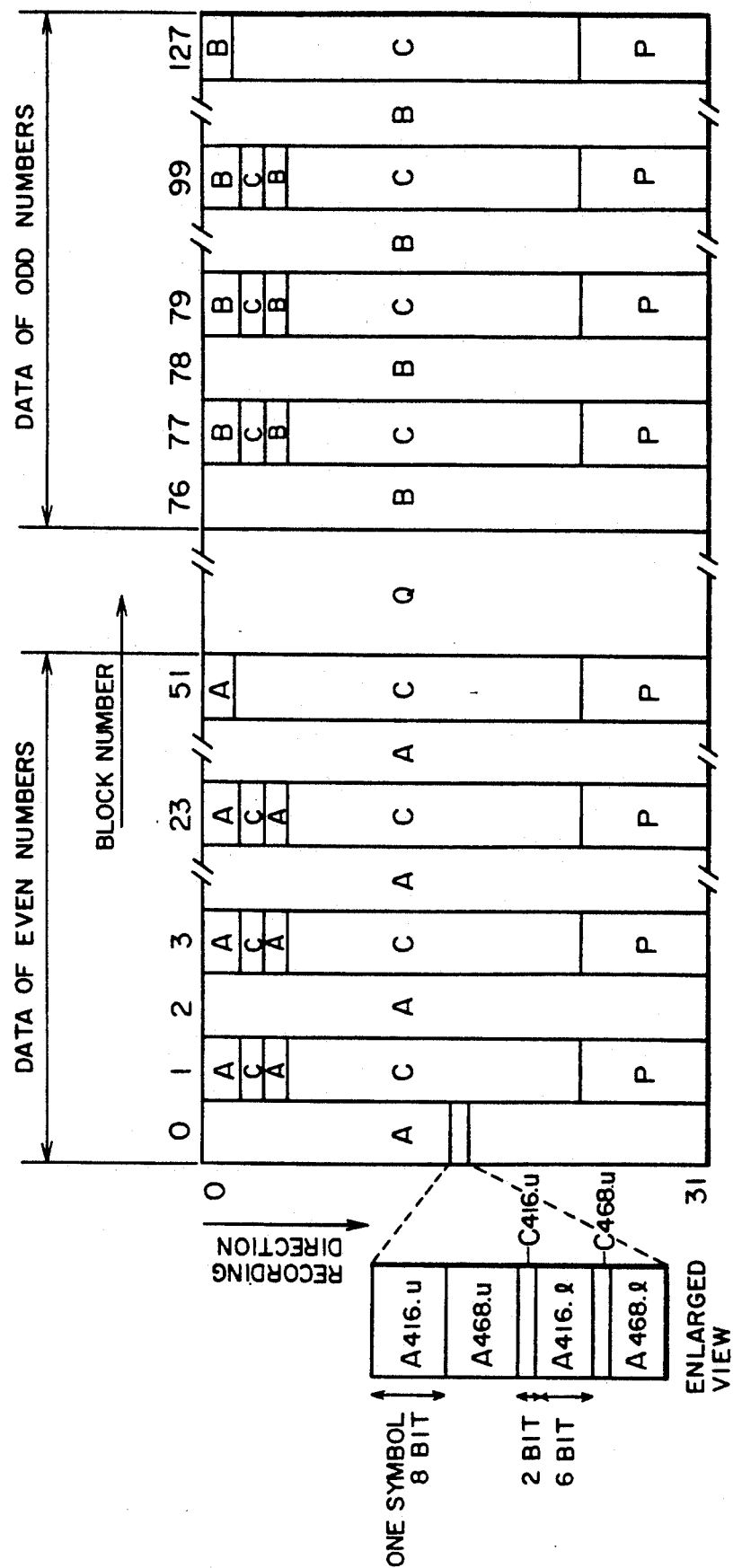
FIGS. 11 and 12 are diagrams showing examples of the recording format which are employed in the apparatus shown in FIG. 9.
Figure 12:
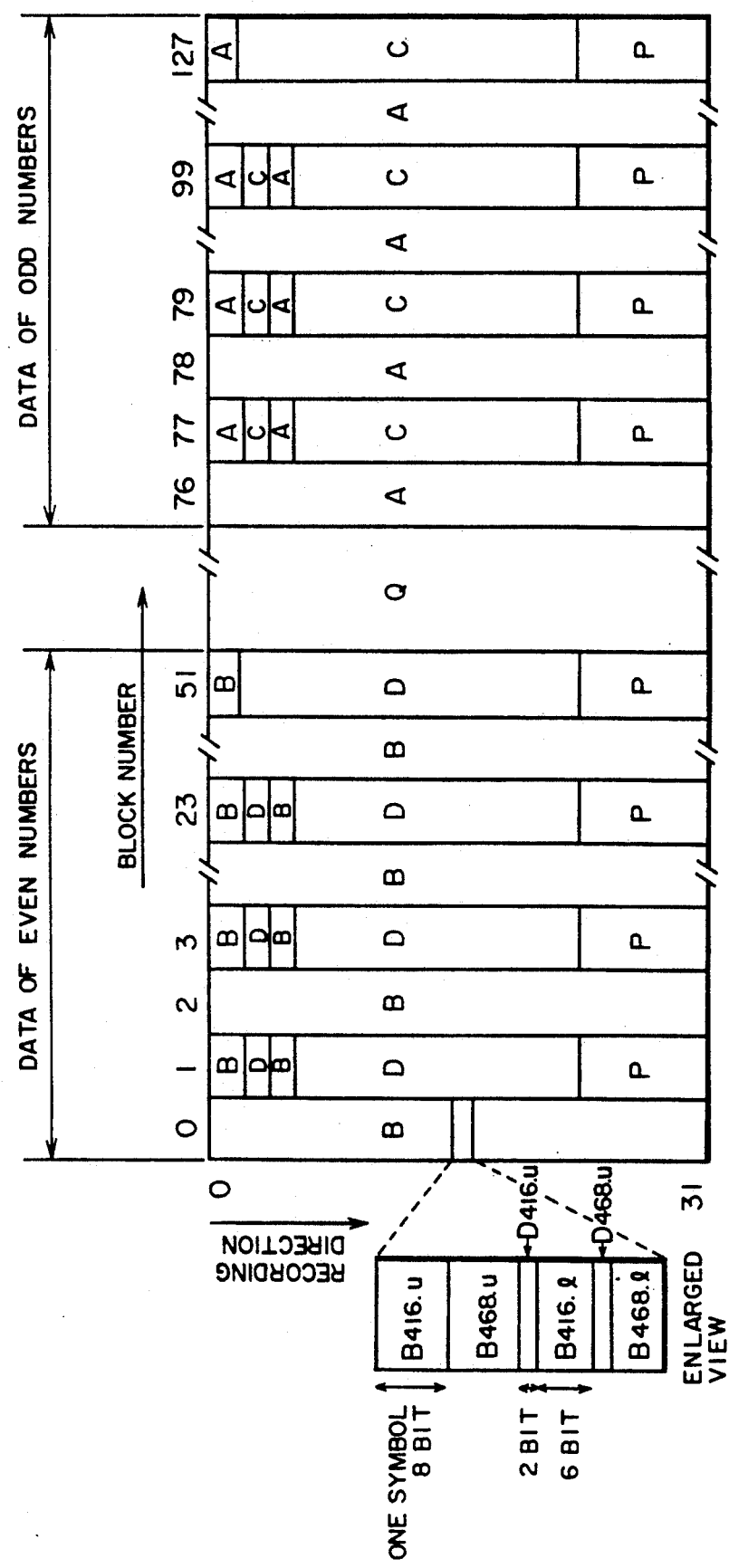

At this juncture, it should be mentioned that since the data are processed on a sixteen bit basis, the least significant two bits of the PCM signal quantized in 16 bits and sampled at 48 KHz are handled as the dummy data in the recording format shown in FIG. 10A. FIG. 10C shows another concept of disposition of the four channel PCM signals on one track (plus azimuth, minus azimuth). In the disposition shown in FIG. 10C, the four channels are divided into main two channels and sub two channels. The main two channels are each assigned to the PCM signals quantized in 14 bits and sampled at the sampling frequency of 32 KHz, which PCM signal is disposed at the same location as the PCM signal shown in FIG. 10B is recorded. On the other hand, the sub two channels are assigned to the PCM signals consisting of 10 bits for one sample and resulting from the 14-to-10 bit compression by the circuit 44 of the PCM signals each quantized in 14 bits and sampled at 32 KHz. These sub-two-channel PCM signals corresponding to the input analog signals C and D are disposed at the location corresponding to the portion placed with the dummy data in the format shown in FIG. 10B. The conversion of disposition from the format shown in FIG. 10C to that of FIG. 10D may be performed on a symbol basis (i.e. on an eight bit basis). The number of the data bits for one track of the four channel PCM signals is same as that of the two channel PCM signals each quantized in 16 bits and sampled at the frequency of 48 KHz described above in conjunction with FIG. 10A. Accordingly, the transfer rate in the succeeding recording/reproducing processing is same as in the case of the PCM signals shown in FIGS. 10A and 10B. The foregoing description made by reference to FIGS. 10A to 10D concerns only the conceptual disposition of the PCM signals. In the case of the actual DAT system, the interleave and addition of the error correction codes are made in accordance with the format of the DAT system. Consequently, dispositions of the PCM signals are actually such as illustrated in FIGS. 11 and 12. After the conversion of the disposition described above, the subsequent processing up to the recording on the magnetic tape is same as that described hereinbefore in conjunction with the embodiments shown in FIGS. 1 and 5. In the reproducing operation, the processing up to the storage of the data in the RAM 15 is identical with the corresponding processing performed in the system shown in FIGS. 1 and 5. The data stored in the RAM 15 then undergoes the conversion of disposition reversely to the conversion in the recording operation described above and the error correction by the error correcting circuit 20. The signal thus obtained is supplied to a switching circuit 46 by way of the bus line 14. With this switching circuit 46, a 10-to-14 bit expansion circuit 47 is selected for the signals of the channels C and D, while the signals of the channels A and B are directly transferred to a switching circuit 45. The 10-to-14 bit expansion circuit 47 expands the data which underwent the bit compression in the 14-to-10 bit compression circuit 44, the output of the circuit 47 being inputted to a switching circuit 45, which selects either the data from the 10-to-14 bit expansion circuit 47 or the data from the switching circuit 46. The data output from the switching circuit 45 is sequentially converted by a D/A converter 12 into analog signals which are then resampled by sample and hold circuits 11 separately on a channel basis. The resampled analog signals of the individual channels are sent out from output terminals 8 through associated filters 10 and amplifier circuits 9, respectively.

A circuit portion 39 indicated by enclosing with a broken line in FIG. 9 is implemented in the same configuration as the prior art DAT system designed for recording the two channel PCM signals each quantized in 16 bits and sampled at 48 KHz. According to the present invention, the write address control circuit 17 and the read address control circuit 19 of the address generating circuits 17 to 19 are so modified as to be controlled by the control circuits 63 and 64 for realizing the dispositions of the PCM signals shown in FIGS. 11 and 12 while the switching circuit 42, 43, 45 and 46, the 14-to-10 bit compression circuit 44 and the 10-to-14 bit expansion circuit 47 are additionally provided to allow the four channel PCM signals each quantized in 14 bits and sampled at the frequency of 32 KHz to be recorded.

Since the main two channel PCM signals of the four channel PCM signals each quantized in 14 bits and sampled at the frequency of 32 KHz can be recorded in the utterly same format as the two channel PCM signals shown in FIG. 10B which are quantized in 14 bits and sampled at the frequency of 32 KHz, the PCM signal recorded by the system shown in FIG. 9 can be reproduced by the magnetic recording/reproducing apparatus capable of performing reproduction in accordance with the mode illustrated in FIGS. 10A and 10B even when the address generating circuits 17 and 19 are not modified and the switching circuits 42, 43, 45 and 46, the 14-to-10 bit compression circuit 44 and the 10-to-14 bit expansion circuit 47 are not added as in the case of the embodiment of the invention described just above.

Figure 13:
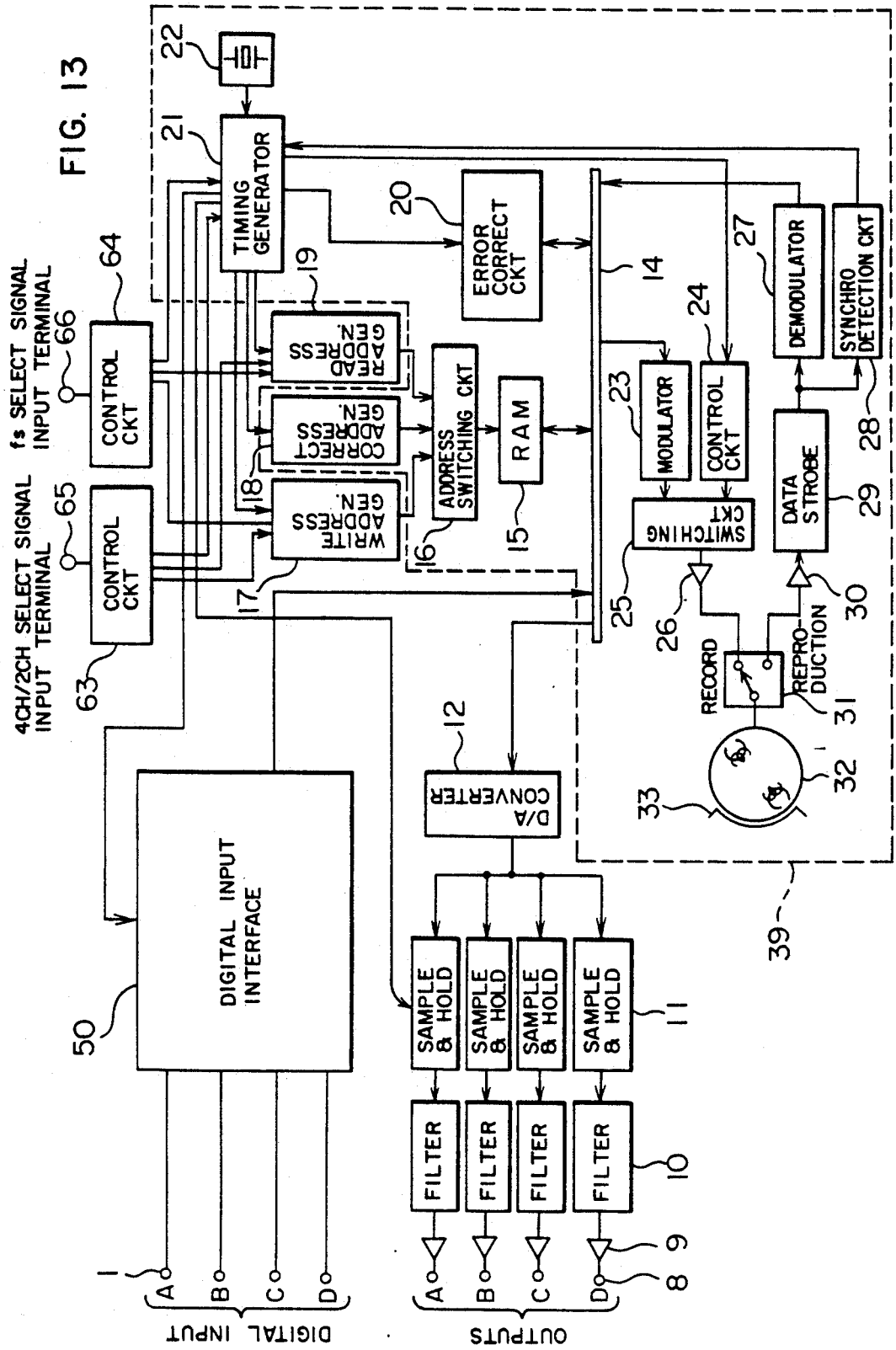
FIGS. 13, 14 and 15 are block diagrams showing, respectively, further embodiments of the present invention.

FIG. 13 shows a further embodiment of the PCM signal recording/reproducing apparatus according to the present invention. This embodiment differs from the one shown in FIG. 1 in that the amplifier circuits 2, the filter 3, the sample and hold circuits 4, the switching circuit 5 and the A/D conversion circuit 6 are replaced by a digital input interface circuit 50. By virtue of the provision of the digital input interface circuit 50, the PCM signal recording/reproducing apparatus according to the instant embodiment can be interfaced with an audio system having four channel PCM outputs, wherein the band limitation is digitally effectuated in the input interface circuit. Needless to say, the output signals of the digital input interface circuits are processed in the same manner as in the case of the embodiment shown in FIG. 1. According to the instant embodiment, the main two channel PCM signals of four channel PCM signals quantized in 14 bits and sampled at 32 KHz as in the case of, for example, the A-mode satellite broadcasting system can be recorded without any appreciable deterioration, while the sub two-channel signals can be recorded with deterioration of the signal only in respect to the band.

Figure 14:
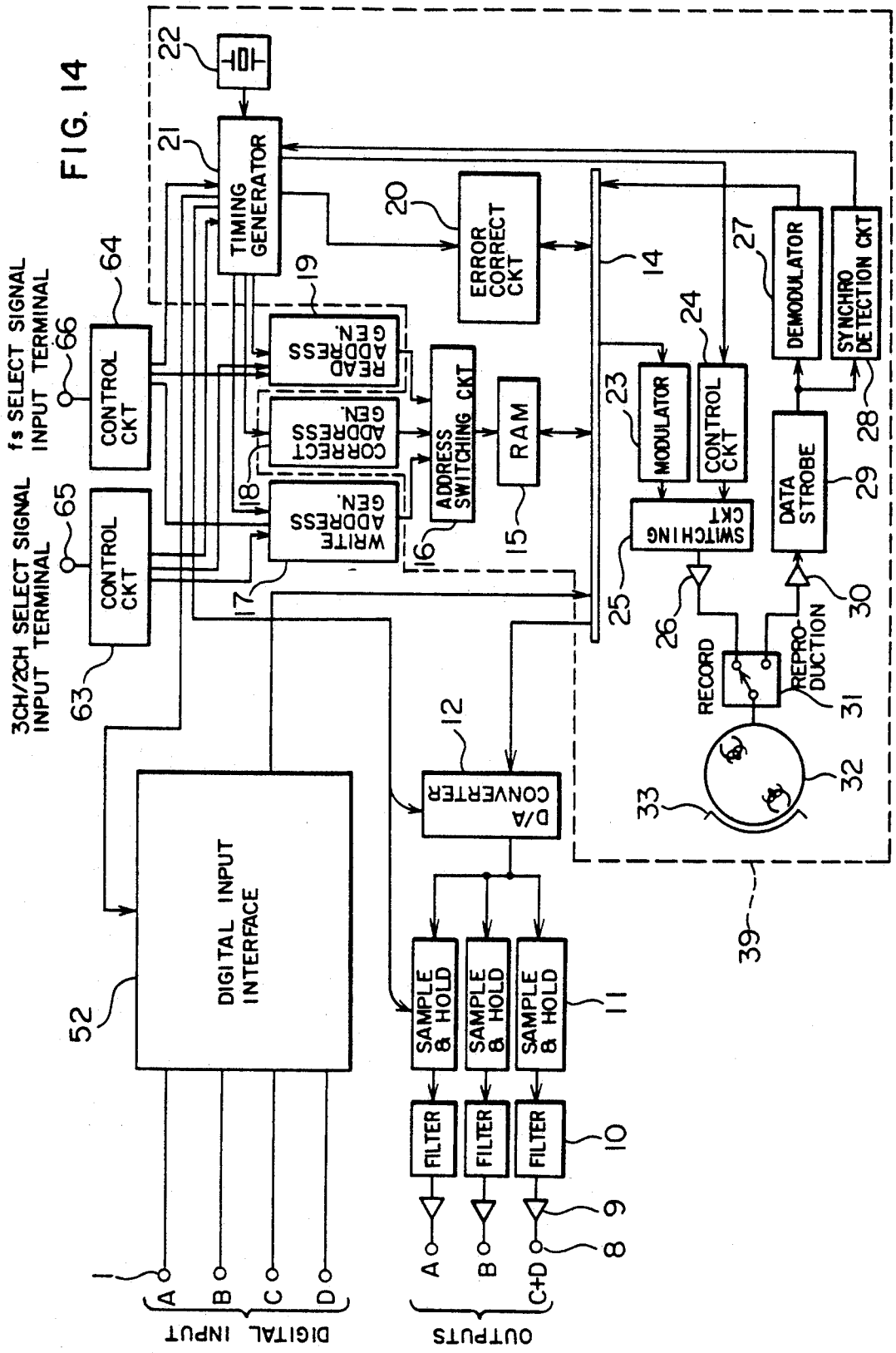

FIG. 14 shows still another embodiment of the magnetic recording/reproducing apparatus according to the present invention which differs from the one shown in FIG. 5 in that the amplifier circuits 2, the filters 3, the sample and hold circuit 4, the switching circuit 5, the A/D conversion circuit 6 and the adder circuit 41 are replaced by a digital input interface circuit 52 which can establish an interface with an audio apparatus having four channel PCM outputs. This digital interface circuit 52 is designed to perform addition of the two sub-channel signals. The output signals of the digital input interface circuit 52 are processed in the same manner as described hereinbefore in conjunction with the embodiment shown in FIG. 5.

According to the instant embodiment, the sub two channel signals of the PCM signal in the A-mode satellite broadcasting is received as the PCM signal of one channel. However, any one of the three channel signals in total can be recorded without any appreciable deterioration in the individual channel signals.

Figure 15:
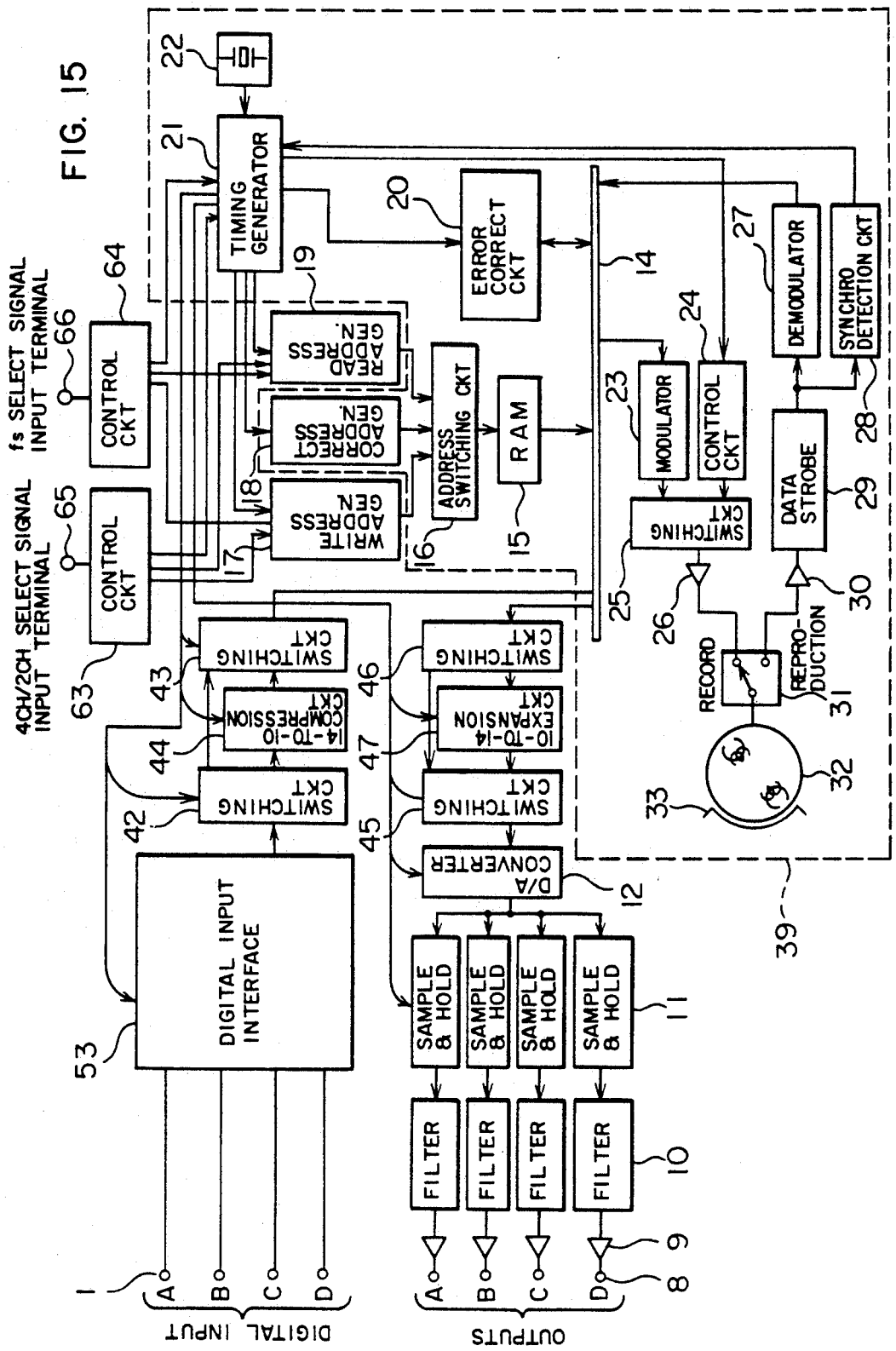

FIG. 15 shows a still further embodiment of the PCM signal recording/reproducing apparatus according to the present invention. This embodiment differs from the one shown in FIG. 9 in that the amplifier circuits 2, the filter 3, the sample and hold circuits 4, the switching circuit 5 and the A/D conversion circuit 6 are replaced by a digital input interface circuit 53. By virtue of the provision of this digital input interface circuit 53, the PCM signal recording/reproducing apparatus according to the instant embodiment can be interfaced with an audio system having four channel PCM outputs. The output signal of the digital input interface circuit is supplied to the switching circuit 42. The succeeding processing is performed in the same manner as in the case of the embodiment shown in FIG. 9. However, in case the two sub-channel PCM signals have already undergone the 14-to-10 bit compression, the switching circuit 44 does not select the 14-to-10 bit compression circuit 44 even for the sub two channel signals.

According to the instant embodiment, the four channel PCM signals, for example, in the A-mode satellite broadcasting are compressed to the quantized bit number of 10 bits. Accordingly, by dividing the four-channels into the main two channels and the sub-two-channels to thereby input the PCM signals expanded to the original fourteen bits in the main two channels while inputting the PCM signals in the compressed state in the sub-two-channels, these signal can be recorded without being attended with any deterioration.

Figure 16:
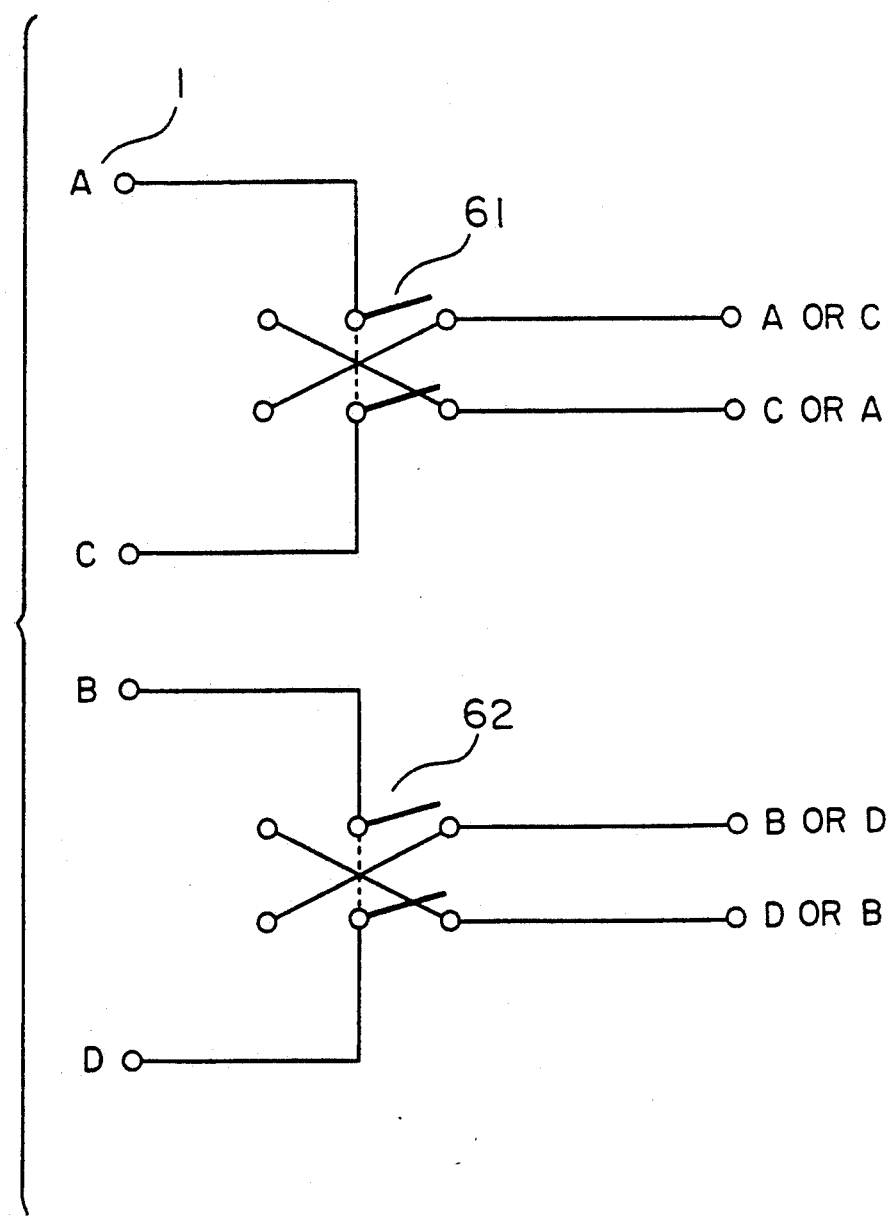
FIG. 16 is a schematic circuit diagram showing a switching circuit which can be employed in an embodiment of the invention.

In all the embodiments described above, the four channel PCM signals are divided into the two main channels and the two sub-channels, wherein the PCM signals in the two sub-channels are of lower quality than those of two main channels. Consequently, there may arise the necessity of exchanging the two main channel signals and the sub two channel signals with each other in dependence on the nature of the signals, when occasion requires. This can however be readily accomplished by connecting an input signal switching (change-over) circuit to the input terminals. An exemplary embodiment of such switching circuit is shown in FIG. 16. Referring to the Figure, the input signals are applied to the input terminals 1, whereupon the main two channel signals and the sub two channel signals are changed over to each other by means of two-way switches 61 and 62 to be outputted. By the addition of the switching circuit shown in FIG. 16 to the PCM signal recording/reproducing apparatus shown in FIGS. 1, 5, 9, 13, 14 and 15, respectively, there can be obtained such advantage that the signals of two channels capable of being recorded without any appreciable deterioration in the tone quality can be selected from the four channel signals, for example, in the satellite broadcasting.

As is appreciated from the foregoing description, there have been provided according to the present invention a magnetic PCM signal recording/reproducing apparatus in which the PCM signals of two channels each having a sampling frequency of 48 KHz and a quantized bit number of 16 can be recorded in accordance with a record format together with the PCM signals of two channels each having a sampling frequency of 32 KHz and a quantized bit number of 16 in accordance with a recording format corresponding to the abovementioned format except that a blank portion of the former is placed with dummy data so that the same recording rate can be realized for both of the two channel PCM signals, whereby the PCM signals of four channels can be recorded. Further, the two signals of the main channels recorded by the apparatus according to the invention can be reproduced by other magnetic recording/reproducing apparatus having recording format for the sampling frequency of 48 KHz and 32 KHz, respectively, to further advantage.

What is claimed is:

1. In a PCM signal recording apparatus for recording a PCM signal in a recording mode selected from a first two-channel recording mode in which first two-channel data quantized in n bits and sampled at a first sampling frequency p is recorded, and a second two-channel recording mode in which second two-channel data quantized in m bits and sampled at a second sampling frequency q is recorded together with dummy data, an amount w of the dummy data being defined by the expression $w = (p \times n \times 2) - (q \times m \times 2)$, the apparatus including recording means for recording data on a recording medium and storage means for temporarily storing data to be recorded on the recording medium, a method of recording on the recording medium four-channel data quantized in m bits and sampled at the second sampling frequency q, comprising the steps of:

selecting data of two channels from the four-channel data;

defining the selected data of two channels to be main two-channel data;

defining data of the other two channels of the four-channel data to be sub two-channel data;

temporarily storing in the storage means the main two-channel data quantized in m bits and sampled at the second sampling frequency q in the same format in which the second two-channel data quantized in m bits and sampled at the second sampling frequency q is recorded in the second two-channel recording mode;

compressing the sub two-channel data quantized in m bits and sampled at the second sampling frequency q to obtain compressed sub two-channel data having l bits so as to satisfy the expression $p \times n \times 2 \geq (q \times m \times 2) + (q \times l \times 2)$;

temporarily storing in the storage means the compressed sub two-channel data int he same format in which the dummy data is recorded in the second two-channel recording mode; and recording the main two-channel data and the compressed sub two-channel data stored in the storage means on the recording medium using the recording means.

2. In a PCM signal recording apparatus for recording a PCM signal in a recording mode selected from a first two-channel recording mode in which first two-channel data quantized in n bits and sampled at a first sampling frequency p is recorded, and a second two-channel recording mode in which second two-channel data quantized in m bits and sampled at a second sampling frequency q is recorded together with dummy data, an amount w of the dummy data being defined by the expression $w = (p \times n \times 2) - (q \times m \times 2)$, the apparatus including recording means for recording data on a recording medium and storage means for temporarily storing data to be recorded on the recording medium, means for recording on the recording medium four-channel data quantized in m bits and sampled at the second sampling frequency q, comprising:

switch means for selecting data of two channels from the four-channel data;

means for defining the selected data of two channels to be main two-channel data;

means for defining data of the other two channels of the four-channel data to be sub two-channel data;

first data conversion means for temporarily storing in the storage means the main two-channel data quantized in m bits and sampled at the second sampling frequency q in the same format in which the second two-channel data quantized in m bits and sampled at the second sampling frequency q is recorded in the second two-channel recording mode;

data compression means for compressing the sub two-channel data quantized in m bits and sampled at the second sampling frequency q to obtain compressed sub two-channel data having l bits so as to satisfy the expression $p \times n \times 2 \geq (q \times m \times 2) + (q \times l \times 2)$;

second data conversion means for temporarily storing in the storage means the compressed sub two-channel data in the same format in which the dummy data is recorded in the second two-channel recording mode; and means for recording the main two-channel data and the compressed sub two-channel data stored in the storage means on the recording medium using the recording means.

3. In a PCM signal recording apparatus for recording a PCM signal in a recording mode selected from a first two-channel recording mode in which first two-channel data quantized in n bits and sampled at a first sampling frequency p is recorded, and a second two-channel recording mode in which second two-channel data quantized in m bits and sampled at a second sampling frequency q is recorded together with dummy data, an amount w of the dummy data being defined by the expression $w = (p \times n \times 2) - (q \times m \times 2)$, the apparatus including recording means for recording data on a recording medium and storage means for temporarily storing data to be recorded on the recording medium, a method of recording on the recording medium four-channel data quantized in m bits and sampled at the second sampling frequency q, comprising the steps of:

selecting data of two channels from the four-channel data;

defining the selected data of two channels to be main two-channel data;

defining data of the other two channels of the four-channel data to be sub two-channel data;

temporarily storing in the storage means the main two-channel data quantized in m bits and sampled at the second sampling frequency q in the same format in which the second two-channel data quantized in m bits and sampled at the second sampling frequency q is recorded in the second two-channel recording mode;

converting the sub two-channel data quantized in m bits and sampled at the second sampling frequency q into converted sub two-channel data quantized in m bits and sampled at a third sampling frequency r so as to satisfy the expression $p \times n \times 2 \geq (q \times m \times 2) + (r \times m \times 2)$;

temporarily storing in the storage means the converted sub two-channel data in the same format in which the dummy data is recorded in the second two-channel recording mode; and recording the main two-channel data and the converted sub two-channel data stored in the storage means on the recording medium using the recording means.

4. In a PCM signal recording apparatus for recording a PCM signal in a recording mode selected from a first two-channel recording mode in which first two-channel data quantized in n bits and sampled at a first sampling frequency p is recorded, and a second two-channel recording mode in which second two-channel data quantized in m bits and sampled at a second sampling frequency q is recorded together with dummy data, an amount w of the dummy data being defined by the expression $w = (p \times n \times 2) - (q \times m \times 2)$, the apparatus including recording means for recording data on a recording medium and storage means for temporarily storing data to be recorded on the recording medium, a method of recording on the recording medium four-channel data quantized in m bits and sampled at the second sampling frequency q, comprising the steps of:

selecting data of two channels from the four-channel data;

defining the selected data of two channels to be main two-channel data;

defining data of the other two channels of the four-channel data to be sub two-channel data;

temporarily storing in the storage means the main two-channel data quantized in m bits and sampled at the second sampling frequency q in the same format in which the second two-channel data quantized in m bits and sampled at the second sampling frequency q is recorded in the second two-channel recording mode;

adding data of one channel of the sub two-channel data quantized in m bits and sampled at the second sampling frequency q to data of the other channel of the sub two-channel data to obtain one-channel sum data;

temporarily storing in the storage means the one-channel sum data in the same format in which the dummy data is recorded in the second two-channel recording mode; and recording the main two-channel data and the one-channel sum data stored in the storage means on the recording medium using the recording means.

5. A method of recording a PCM signal on a recording medium in a recording mode selected from a first two-channel recording mode in which first two-channel data quantized in n bits and sampled at a first sampling frequency p is recorded on the recording medium, a second two-channel recording mode in which second two-channel data quantized in m bits and sampled at a second sampling frequency q is recorded on the recording medium together with dummy data, an amount w of the dummy data being defined by the expression $w = (p \times n \times 2) - (q \times m \times 2)$, and a four-channel recording mode in which four-channel data quantized in m bits and sampled at the second sampling frequency q is recorded on the recording medium, the method comprising the steps of:

selecting the four-channel recording mode;

obtaining four-channel data quantized in m bits and sampled at the second sampling frequency q;

defining data of two channels of the four-channel data to be main two-channel data;

defining data of the other two channels of the four-channel data to be sub two-channel data;

temporarily storing the main two-channel data quantized in m bits and sampled at the second sampling frequency q in the same format in which second two-channel data quantized in m bits and sampled at the second sampling frequency q is recorded in the second two-channel recording mode;

reducing an amount z of the sub two-channel data quantized in m bits and sampled at the second sampling frequency q to obtain reduced sub two-channel data so as to satisfy the expression $w \geq z$;

temporarily storing the reduced sub two-channel data in the same format in which dummy data is recorded in the second two-channel recording mode; and recording the temporarily-stored main two-channel data and the temporarily-stored reduced sub two-channel data on the recording medium.

6. A PCM signal recording method according to claim 5, wherein n is 16, p is 48 kHz, m is one of 16 and 14, and q is 32 kHz.

7. A PCM signal recording method according to claim 5, further comprising the step of selecting data of two channels from the four-channel data, wherein the step of defining data of two channels of the four-channel data to be main two-channel data includes defining the selected data of two channels to be main two-channel data.

8. A PCM signal recording method according to claim 5, wherein the step of reducing an amount z of the sub two-channel data includes compressing the sub two-channel data quantized in m bits and sampled at the second sampling frequency q to obtain compressed sub two-channel data having l bits so as to satisfy the expression $p \times n \times 2 \geq (q \times m \times 2) + (q \times l \times 2)$.

9. A PCM signal recording method according to claim 8, wherein n is 16, p is 48 kHz, m is 14, q is 32 kHz, and l is 10.

10. A PCM signal recording method according to claim 5, wherein the step of reducing an amount z of the sub two-channel data includes converting the sub two-channel data quantized in m bits and sampled at the second sampling frequency q into converted sub two-channel data quantized in m bits and sampled at a third sampling frequency r so as to satisfy the expression $p \times n \times 2 \geq (q \times m \times 2) + (r \times m \times 2)$.

11. A PCM signal recording method according to claim 10, wherein n is 16, p is 48 kHz, m is 16, q is 32 kHz, and r is 16 kHz.

12. A PCM signal recording method according to claim 5, wherein the step of reducing an amount z of the sub two-channel data includes adding data of one channel of the sub two-channel data quantized in m bits and sampled at the second sampling frequency q to data of the other channel of the sub two-channel data to obtain one-channel sum data.

13. A PCM signal recording method according to claim 12, wherein n is 16, p is 48 kHz, m is 16, and q is 32 kHz.

14. An apparatus for recording a PCM signal on a recording medium in a recording mode selected from a first two-channel recording mode in which first two-channel data quantized in n bits and sampled at a first sampling frequency p is recorded on the recording medium, a second two-channel recording mode in which second two-channel data quantized in m bits and sampled at a second sampling frequency q is recorded on the recording medium together with dummy data, an amount w of the dummy data being defined by the expression $w = (p \times n \times 2) - (q \times m \times 2)$, and a four-channel recording mode in which four-channel data quantized in m bits and sampled at the second sampling frequency q is recorded on the recording medium, the apparatus comprising:

means for selecting the four-channel recording mode;

means for obtaining four-channel data quantized in m bits and sampled at the second sampling frequency q;

means for defining data of two channels of the four-channel data to be main two-channel data;

means for defining data of the other two channels of the four-channel data to be sub two-channel data;

means for temporarily storing the main two-channel data quantized in m bits and sampled at the second sampling frequency q in the same format in which second two-channel data quantized in m bits and sampled at the second sampling frequency q is recorded in the second two-channel recording mode;

means for reducing an amount z of the sub two-channel data quantized in m bits and sampled at the second sampling frequency q to obtain reduced sub two-channel data so as to satisfy the expression $w \geq z$;

means for temporarily storing the reduced sub two-channel data in the same format in which dummy data is recorded in the second two-channel recording mode; and means for recording the temporarily-stored main two-channel data and the temporarily-stored reduced sub two-channel data on the recording medium.

15. A PCM signal recording apparatus according to claim 14, wherein n is 16, p is 48 kHz, m is one of 16 and 14, and q is 32 kHz.

16. A PCM signal recording apparatus according to claim 14, further comprising means for selecting data of two channels from the four-channel data, wherein the means for defining data of two channels of the four-channel data to be main two-channel data includes means for defining the selected data of two channels to be main two-channel data.

17. A PCM signal recording apparatus according to claim 14, wherein the means for reducing an amount z of the sub two-channel data includes means for compressing the sub two-channel data quantized in m bits and sampled at the second sampling frequency q to obtain compressed sub two-channel data having l bits so as to satisfy the expression $p \times n \times 2 \geq (q \times m \times 2) + (q \times l \times 2)$.

18. A PCM signal recording apparatus according to claim 17, wherein n is 16, p is 48 kHz, m is 14, q is 32 kHz, and l is 10.

19. A PCM signal recording apparatus according to claim 14, wherein the means for reducing an amount z of the sub two-channel data includes means for converting the sub two-channel data quantized in m bits and sampled at the second sampling frequency q into converted sub two-channel data quantized in m bits and sampled at a third sampling frequency r so as to satisfy the expression $p \times n \times 2 \geq (q \times m \times 2) + (r \times m \times 2)$.

20. A PCM signal recording apparatus according to claim 19, wherein n is 16, p is 48 kHz, m is 16, q is 32 kHz, and r is 16 kHz.

21. A PCM signal recording apparatus according to claim 14, wherein the means for reducing an amount z of the sub two-channel data includes adding data of one channel of the sub two-channel data quantized in m bits and sampled at the second sampling frequency q to data of the other channel of the sub two-channel data to obtain one-channel sum data.

22. A PCM signal recording apparatus according to claim 21, wherein n is 16, p is 48 kHz, m is 16, and q is 32 kHz.

* * * * *